(12) United States Patent
Yokogawa

(10) Patent No.: US 8,704,934 B2
(45) Date of Patent: Apr. 22, 2014

(54) SOLID-STATE IMAGING DEVICE HAVING PIXELS ARRANGED IN A HONEYCOMB STRUCTURE

(75) Inventor: Sozo Yokogawa, Tokyo (JP)

(73) Assignee: Sony Corporation (JP)

( * ) Notice: Subject to any disclaimer, the term of this patent is extended or adjusted under 35 U.S.C. 154(b) by 685 days.

(21) Appl. No.: 12/655,699

(22) Filed: Jan. 6, 2010

(65) Prior Publication Data

US 2010/0171854 A1 Jul. 8, 2010

(30) Foreign Application Priority Data

Jan. 8, 2009 (JP) ................................ P2009-002441

(51) Int. Cl.
*H04N 5/225* (2006.01)
(52) U.S. Cl.
USPC ......................................................... 348/340
(58) Field of Classification Search
None
See application file for complete search history.

(56) References Cited

U.S. PATENT DOCUMENTS

| | | | |
|---|---|---|---|
| 6,380,938 B1 * | 4/2002 | Ngan ............................ | 345/440 |
| 6,590,270 B2 * | 7/2003 | Suzuki .......................... | 257/436 |
| 7,101,726 B2 | 9/2006 | Yamamoto et al. | |
| 7,140,205 B2 | 11/2006 | Fujiwara et al. | |
| 7,382,010 B2 | 6/2008 | Choi | |
| 2002/0036257 A1 * | 3/2002 | Yamashita et al. ......... | 250/208.1 |
| 2006/0038904 A1 | 2/2006 | Kudoh | |
| 2006/0118837 A1 * | 6/2006 | Choi ............................. | 257/292 |
| 2006/0249803 A1 | 11/2006 | Yamamoto et al. | |
| 2007/0034884 A1 * | 2/2007 | McKee ......................... | 257/89 |
| 2007/0215971 A1 | 9/2007 | Yamamoto et al. | |
| 2008/0018765 A1 * | 1/2008 | Choi et al. .................... | 348/308 |
| 2008/0056618 A1 * | 3/2008 | Yoshino et al. .............. | 382/300 |
| 2008/0088724 A1 * | 4/2008 | Kudoh .......................... | 348/300 |
| 2009/0011534 A1 | 1/2009 | Yamamoto et al. | |
| 2009/0268983 A1 * | 10/2009 | Stone et al. ................... | 382/284 |

FOREIGN PATENT DOCUMENTS

| | | |
|---|---|---|
| JP | 01213079 A | 8/1989 |
| JP | 2600250 A | 8/1989 |
| JP | 2001352554 A | 12/2001 |
| JP | 2002077731 A | 3/2002 |
| JP | 2004-002153 A | 1/2004 |
| JP | 2005-150463 A | 6/2005 |
| JP | 2006-054276 A | 2/2006 |
| JP | 2006-165567 A | 6/2006 |
| JP | 2007043689 A | 2/2007 |
| JP | 2007158109 A | 6/2007 |
| JP | 2007311413 A | 11/2007 |

OTHER PUBLICATIONS

Office Action from Japanese Application No. 2009-002441, dated Jan. 4, 2011.
Adkisson et al., "Optimization of Cu Interconnect Layers for 2.7 µm Pixel Image Sensor Technology: Fabrication, Modeling, and Optical Results", IEEE Workshop on CCDs and Advanced Image Sensors, pp. 1-4 (2005).
Mabuchi et al., "FD-Driving CMOS Image Sensors with Low-Voltage Driving Technologies", Technical Research Report of the Institute of Electronics, Information and Communication Engineers, vol. 1, No. 66 (May 13, 2004), pp. 51-56.

* cited by examiner

*Primary Examiner* — Justin P Misleh
(74) *Attorney, Agent, or Firm* — Lerner, David, Littenberg, Krumholz & Mentlik, LLP

(57) ABSTRACT

A solid-state imaging device includes: a light-receiving element making a photoelectric conversion and being disposed in each of a plurality of pixels, wherein a honeycomb structure in which a predetermined pixel is surrounded with six pixels neighboring the predetermined pixel out of the plurality of pixels or a structure in which one to three pixels out of the six neighboring pixels are omitted from the honeycomb structure is used as a basic unit.

9 Claims, 21 Drawing Sheets

SOLID-STATE IMAGING DEVICE HAVING PIXELS ARRANGED IN A HONEYCOMB STRUCTURE

CROSS-REFERENCE TO RELATED APPLICATION

The present application claims priority from Japanese Patent Application No. JP 2009-002441 filed in the Japanese Patent Office on Jan. 8, 2009, the entire content of which is incorporated herein by reference.

BACKGROUND OF THE INVENTION

1. Field of the Invention

The present invention relates to a solid-state imaging device, and more particularly, to a solid-state imaging device which can reduce the number of mounted transistors, which has a high planar filling rate of pixels, and which can collect light with a high efficiency.

2. Description of the Related Art

In recent years, electronic devices such as digital still cameras or camcorders for capturing an image of a subject using a solid-state imaging device and forming an image were more and more spread. CCD (Charge Coupled Device) image sensors or CMOS (Complementary Metal Oxide Semiconductor) image sensors were known as such solid-state imaging devices. They are all called image sensors. The image sensors are premised on techniques using a pixel as a unit.

The techniques using a pixel as a unit are applied to a display side as well as an image-capturing side. Such techniques using a pixel as a unit are disclosed in Japanese Patent No. 2600250 (Patent Document 1), JP-A-2004-2153 (Patent Document 2), JP-A-2005-150463 (Patent Document 3), JP-A-2006-165567 (Patent Document 4), JP-A-2006-54276 (Patent Document 5), IEEE Workshop on CCDs and Advanced Image Sensors, pp. 1-4 (2005), by J. Adkisson, et al. (Non-Patent Document 1), and Technical Research Report of the Institute of Electronics, Information and Communication Engineers Vol. 104, No. 66 (20040513) pp. 51-56, by Keiji Mabuchi (Non-Patent Document 2).

SUMMARY OF THE INVENTION

In recent years, requirements have increased for a solid-state imaging device which can reduce the number of mounted transistors, which has a high planar filling rate of pixels, and which can collect light with a high efficiency. However, the known techniques including Patent Documents 1 to 5 and Non-Patent Documents 1 and 2 did not satisfactorily cope with such requirements.

Thus, it is desirable to reduce the number of mounted transistors, to enhance a planar filling rate of pixels, and to collect light with a high efficiency.

According to an embodiment of the invention, there is provided a solid-state imaging device including a light-receiving element making a photoelectric conversion and being disposed in each of a plurality of pixels, wherein a honeycomb structure in which a predetermined pixel is surrounded with six pixels neighboring the predetermined pixel out of the plurality of pixels or a structure in which one to three pixels out of the six neighboring pixels are omitted from the honeycomb structure is used as a basic unit.

The basic unit may include: a transmission transistor disposed in each pixel of the basic unit; and a reset transistor, a selection transistor, and an amplification transistor which are shared by the pixels of the basic unit.

The basic unit may include: a transmission transistor disposed in each pixel of the basic unit; and a reset transistor and an amplification transistor which are shared by the pixels of the basic unit. Here, the transistors of the basic unit may be driven by an FD driving method of controlling an FD (Floating Diffusion) potential by driving the drain terminals thereof with pulses.

The solid-state imaging device may further include light-collecting elements.

One light-collecting element may be shared by the pixels disposed on a circumference having as a radius a predetermined distance equal to or greater than a distance from the predetermined pixel to the neighboring pixels or inside the circumference.

The solid-state imaging device may focus light from a subject, and may detect a phase difference of an object located before or after a focusing position to make a focusing determination or to acquire distance information to the object by causing a subset of the entire light flux from the object to selectively reach the pixels by the use of the light-collecting elements.

Optical axes of the light-collecting elements and the centers of the light-receiving elements may be non-eccentrically aligned with each other at the central portion of the solid-state imaging device, and the optical axes of the light-collecting elements and the centers of the light-receiving elements may be aligned eccentrically toward the central portion depending on the distance from the central portion.

The solid-state imaging device may further include N types (where N is an integer equal to or greater than 3) of filters selectively transmitting specific wavelengths of light beams. Here, predetermined types of filters out of the N types of filters may be disposed in the pixels of the basic unit.

A type of filter may be disposed in each pixel of the basic unit and a color of the pixel may be interpolated by a calculation using a light intensity value of another pixel in which the corresponding type of filter is disposed and a relative pixel pitch between the pixel and the another pixel.

When the pixel pitch is not an integral multiple of a unit pixel pitch, the pixel pitch may be approximated to an integral multiple to calculate the color of the pixel.

According to another embodiment of the invention, there is provided a solid-state imaging device including a light-receiving element making a photoelectric conversion and a light-collecting element in each of a plurality of pixels, wherein a square matrix structure, in which the light-receiving elements are arranged at vertexes of a lattice shape formed by two perpendicular axes, is employed as an arrangement structure of the light-receiving elements, and a honeycomb structure, in which a predetermined pixel is surrounded with six pixels neighboring the predetermined pixel out of the plurality of pixels, or a structure in which one to three pixels out of the six neighboring pixels are omitted from the honeycomb structure, is employed as an arrangement structure of the light-collecting elements.

According to the above-mentioned embodiments of the invention, it is possible to provide a solid-state imaging device which can reduce the number of mounted transistors, which has a high planar filling rate of pixels, and which can collect light with a high efficiency.

DESCRIPTION OF PREFERRED EMBODIMENTS

1. Past Pixel Structure

For the purpose of easy understanding of the invention, the outline of a known pixel arrangement will be first described.

Figure 1A:
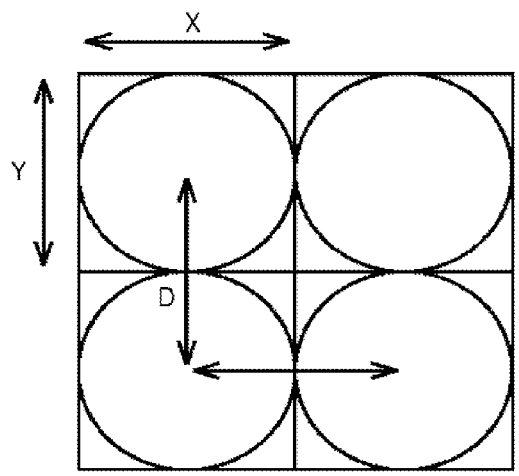
FIGS. 1A and 1B are diagrams illustrating a relative position relation between neighboring pixels.
Figure 1B:
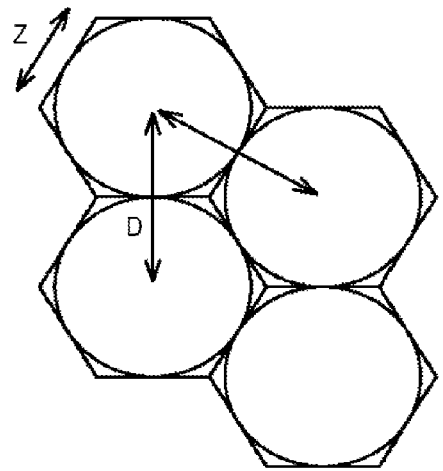

FIGS. 1A and 1B show relative position relations between neighboring pixels. FIG. 1A shows the relative position relation between neighboring pixels in a square matrix structure. FIG. 1B shows the relative position relation between neighboring pixels in a honeycomb structure.

In a typical solid-state imaging device known in the past, the structure shown in FIG. 1A, that is, the structure in which pixels are arranged at vertexes of a lattice shape formed by two perpendicular axes (hereinafter, referred to as square matrix structure), or a structure obtained by inclining the square matrix structure by 45 degrees was widely employed. Since two axes of the horizontal axis and the vertical axis are perpendicular to each other in such a structure, the structure is suitable for reading signals accumulated in the pixels.

On the other hand, many solid-state imaging devices have a three-dimensional structure in which a metal interconnection, a planarization layer, a color filter, and the like are stacked on the top surfaces of light-receiving elements. The effective aperture ratio is lowered due to the shielding effect based on the three-dimensional structure. Accordingly, techniques for efficiently collecting light to the pixels have been suggested in Patent Documents 1 to 4. That is, Patent Document 1 discloses a technique of eccentrically forming on-chip micro lenses corresponding to pixels. Patent Document 2 discloses a technique of forming a clad core structure (waveguide structure) to guide light efficiently to the light-receiving elements. Patent Document 3 discloses a technique of reducing the total thickness of a solid-state imaging device using a Cu interconnection. Patent Document 4 discloses a technique of forming a solid-state imaging device with a rear illuminating structure.

Here, as shown in FIG. 1A, it is assumed in a unit pixel size of a square matrix structure that a horizontal width is X, a vertical width Y, and a pixel pitch is D. For the purpose of convenient explanation, X=Y is also assumed. That is, each pixel has a square shape. In this case, the ratio (filling factor) of the largest circle inscribed in each pixel to a pixel area of A=XY is 78.5 at most.

A honeycomb structure shown in FIG. 1B can be also used as the arrangement of pixels, in addition to the square matrix structure shown in FIG. 1A. For example, in the honeycomb structure where the pixels are arranged on the entire surface of a two-dimensional plane (the plane is two-dimensionally filled with the pixels) with the pixel pitch maintained in D, the filling factor is 90.7, which is greater by 12 than that of the square matrix structure.

In the square matrix structure, the pitches between a pixel and four neighboring pixels in the vertical and horizontal directions are not equal to the pitches between the pixels and four neighboring pixels in the inclined directions. Accordingly, a problem with anisotropy that the resolution in the inclined directions is poorer than the resolution in the vertical and horizontal directions is caused. On the other hand, in the honeycomb structure, the distances between six neighboring pixels are all equal to the pixel pitch D. Accordingly, the anisotropy in resolution is hardly caused.

In this way, the honeycomb structure is excellent in planar filling rate (filling factor) or coupling efficiency to light-collecting elements and is excellent in resolution isotropy of the acquired image, compared with the square matrix structure.

A technique relating to pixels having the honeycomb structure is disclosed in Patent Document 5. Here, it should be noted that the technique disclosed in Patent Document 5 is on the assumption of a display device for two-dimensional data, but not on the assumption of a solid-state imaging device.

Figure 2:
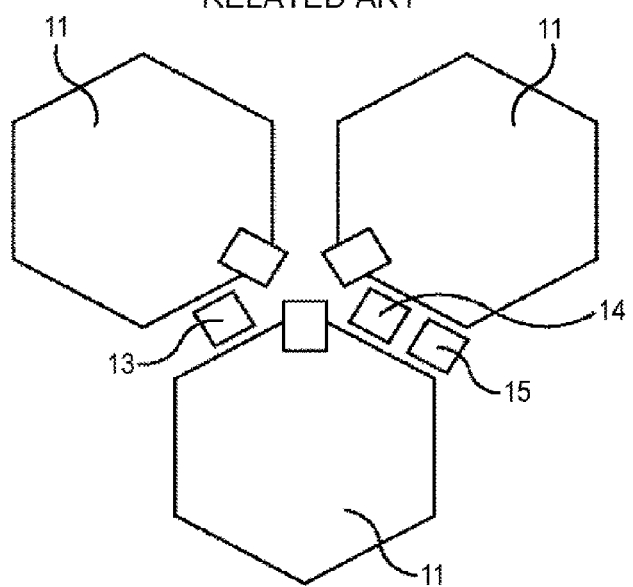
FIG. 2 is a diagram illustrating a circuit configuration of a pixel unit used in the past.

FIG. 2 shows a circuit structure of a pixel unit (hereinafter, referred to as past pixel unit) disclosed in Patent Document 5.

The past pixel unit is a unit including three pixels 11 arranged in a honeycomb structure. As described above, since the past pixel unit is applied to a display device, three pixels 11 of one unit include red/green/blue color filters. By arranging plural past pixel units, the R/G/B pixels 11 are uniformly arranged in each row. Accordingly, it is possible to provide a display device which can reproduce colors with good balance.

However, it is difficult to apply the past pixel unit to a solid-state imaging device (image sensor) without any change. This is because the past pixel unit has a circuit structure specialized in the display device. That is, since a human eye have the most number of optic nerve cells sensitive to green and senses the resolution with green, a study for arranging more green pixels in an image sensor providing an image with high precision or the like is necessary. However, as shown in FIG. 2, the past pixel unit does not have the R/G/B pixel ratio of 1:1:1 and does not have such a pixel arrangement including more green pixels.

When the past pixel unit could be applied to a solid-state imaging device (image sensor), the number of transistors per unit pixel could not be reduced in comparison with a circuit structure of a solid-state imaging device with the above-mentioned square matrix structure. That is, as shown in FIG. 2, the past pixel unit has a structure in which three pixels 11 form one unit. Accordingly, the past pixel unit has a circuit structure in which a reset transistor 13, an amplification transistor 14, and a selection transistor 15 are shared in one unit. In such a circuit structure, six transistors are necessary for three pixels 11. The number of transistors (Tr) per unit pixel is 2.0 Tr/pixel in the past pixel unit and is not smaller than that of the past square matrix structure.

That is, paying attention to the pixel structure of a CMOS image sensor as a solid-state imaging device, a pixel sharing technique capable of reducing the number of transistors per unit pixel as many as possible is important for a decrease in size or a decrease in cost. When the number of transistors is reduced, the occupied area of the photodiode is relatively enhanced, which is advantageous for the sensitivity. Accordingly, high-efficiency pixel sharing methods for a solid-state imaging device with the past square matrix structure have been studied and developed. For example, Non-Patent Document 1 discloses a method of sharing a reset transistor, a selection transistor, and an amplification transistor with 2×2 pixels or 1×4 pixels. Non-Patent Document 2 discloses a method of removing a selection transistor using an FD driving method capable of controlling an FD potential by driving the drain terminals with pulses. The number of transistors per unit pixel in the solid-state imaging device with the past square matrix structure employing such a high-efficiency pixel sharing scheme is rather smaller than that in the past pixel unit.

2. Solid-State Imaging Device According to Embodiment Outline of the Invention

The inventor invented a honeycomb structure (hereinafter, referred to as "present honeycomb structure") in which four or more pixels, for example, seven pixels, form one unit as a pixel arrangement structure of a two-dimensional image sensor as a solid-state imaging device. Accordingly, the solid-state imaging device employing a pixel arrangement with the present honeycomb structure can realize higher light-collecting efficiency than that of the solid-state imaging device employing a pixel arrangement with the past square matrix structure. Since transistors can be shared by four or more pixels, for example, seven pixels by employing the present honeycomb structure, it is possible to easily reduce the number of transistors per pixel in comparison with the past structure of the past unit.

A solid-state imaging device (hereinafter, referred to as image sensor with the present honeycomb structure) employing a pixel arrangement with the present honeycomb structure according to an embodiment of the invention will be described below.

It is assumed hereinafter that a solid-state imaging device (CMOS image sensor: CIS/CMOS IS) of amplifying an electrical signal using a field effect transistor (MOSFET) is used as the image sensor with the present honeycomb structure. Of course, the present honeycomb structure can be applied to other types of solid-state imaging devices.

Example of 7 Sharing Pixels in Image Sensor with Present Honeycomb Structure

Figure 3:
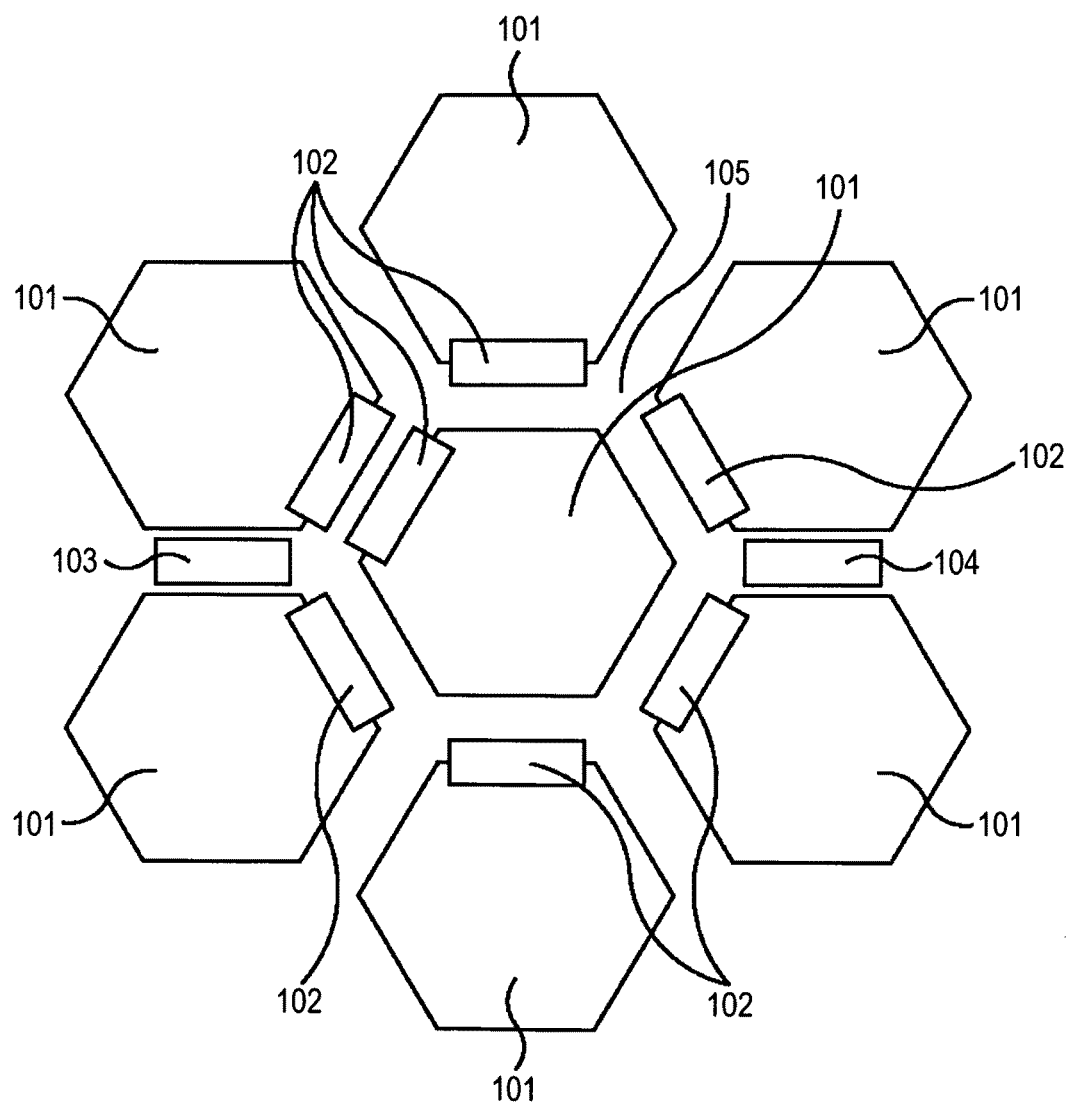
FIG. 3 is a diagram illustrating an arrangement of pixels in an image sensor with a honeycomb structure including 7 sharing pixels according to an embodiment of the invention.

FIG. 3 is a diagram illustrating a pixel arrangement in the image sensor with the present honeycomb structure including 7 sharing pixels.

In the example shown in FIG. 3, seven pixels 101 of a center pixel 101 and six pixels 101 surrounding the center pixel form one unit of the present honeycomb structure.

Each pixel 101 includes a photoelectrical conversion element such as a photodiode. A transmission transistor 102 is disposed in each pixel 101. On the other hand, a reset transistor 103 and an amplification transistor 104 are shared by all the pixels 101 and thus only one is disposed in each unit. An FD (Floating Diffusion) 105 is arranged in a ring shape. In this way, by arranging the FD 105 in a ring shape, it is possible to increase the capacity thereof and to reduce a charge conversion coefficient. As a result, it is possible to accumulate a large amount of charges.

Figure 4:
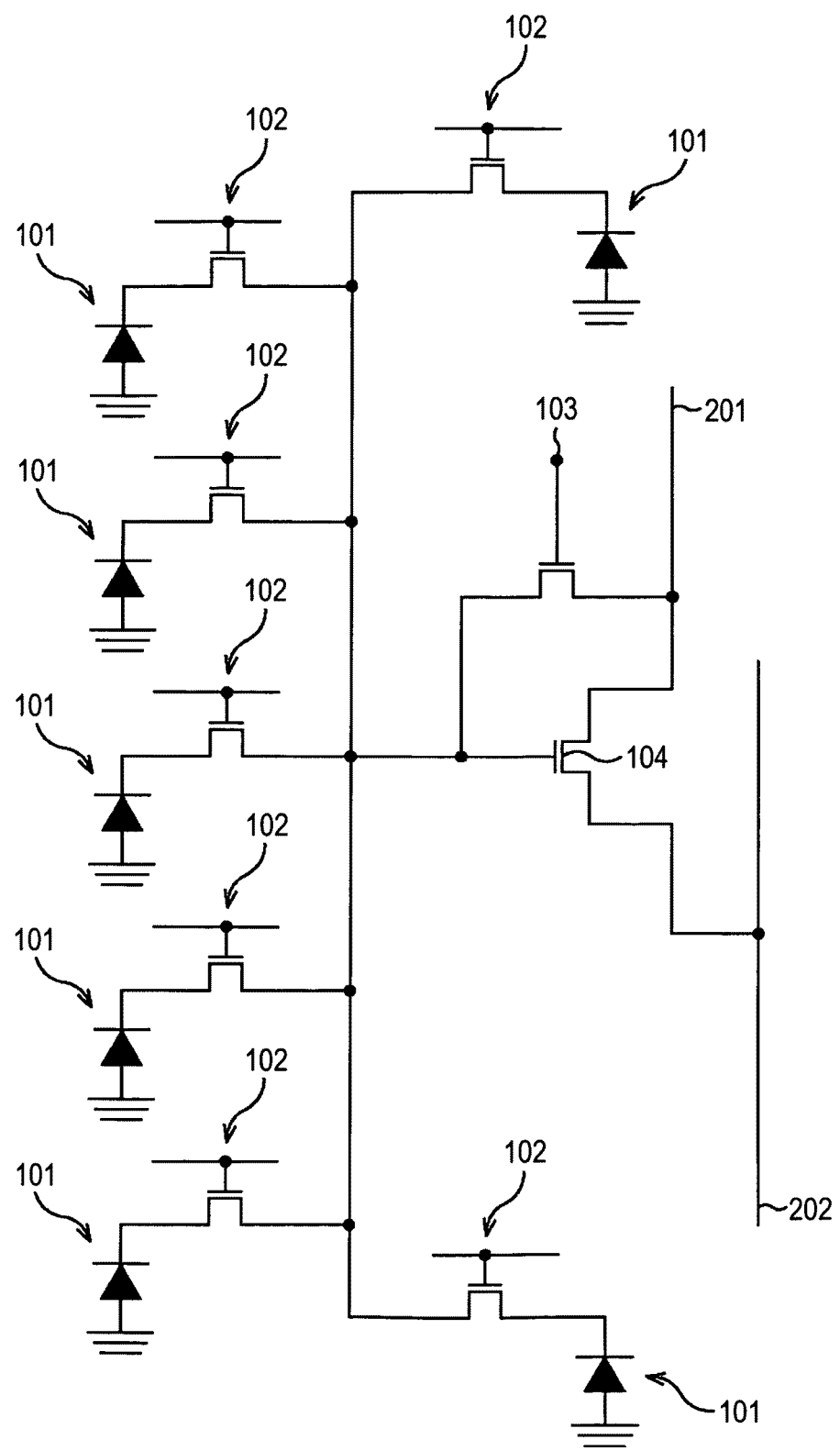
FIG. 4 is a diagram illustrating a circuit configuration of the image sensor with a honeycomb structure including 7 sharing pixels according to the embodiment of the invention.

FIG. 4 shows a circuit structure of the image sensor with the present honeycomb structure including 7 sharing pixels.

The reset transistor 103 and the amplification transistor 104 disposed in each unit are connected to one power supply line 201. The amplification transistor 104 is connected to a signal output line 202.

The transmission transistor 102 of each pixel 101, the reset transistor 103, and the amplification transistor 104 can be formed of, for example, field effect transistors (MOSFET). The field effect transistors are driven using an FD driving method of controlling an FD potential by driving the drain terminals thereof with pulses. Accordingly, the selection transistor is not necessary.

Figure 5:
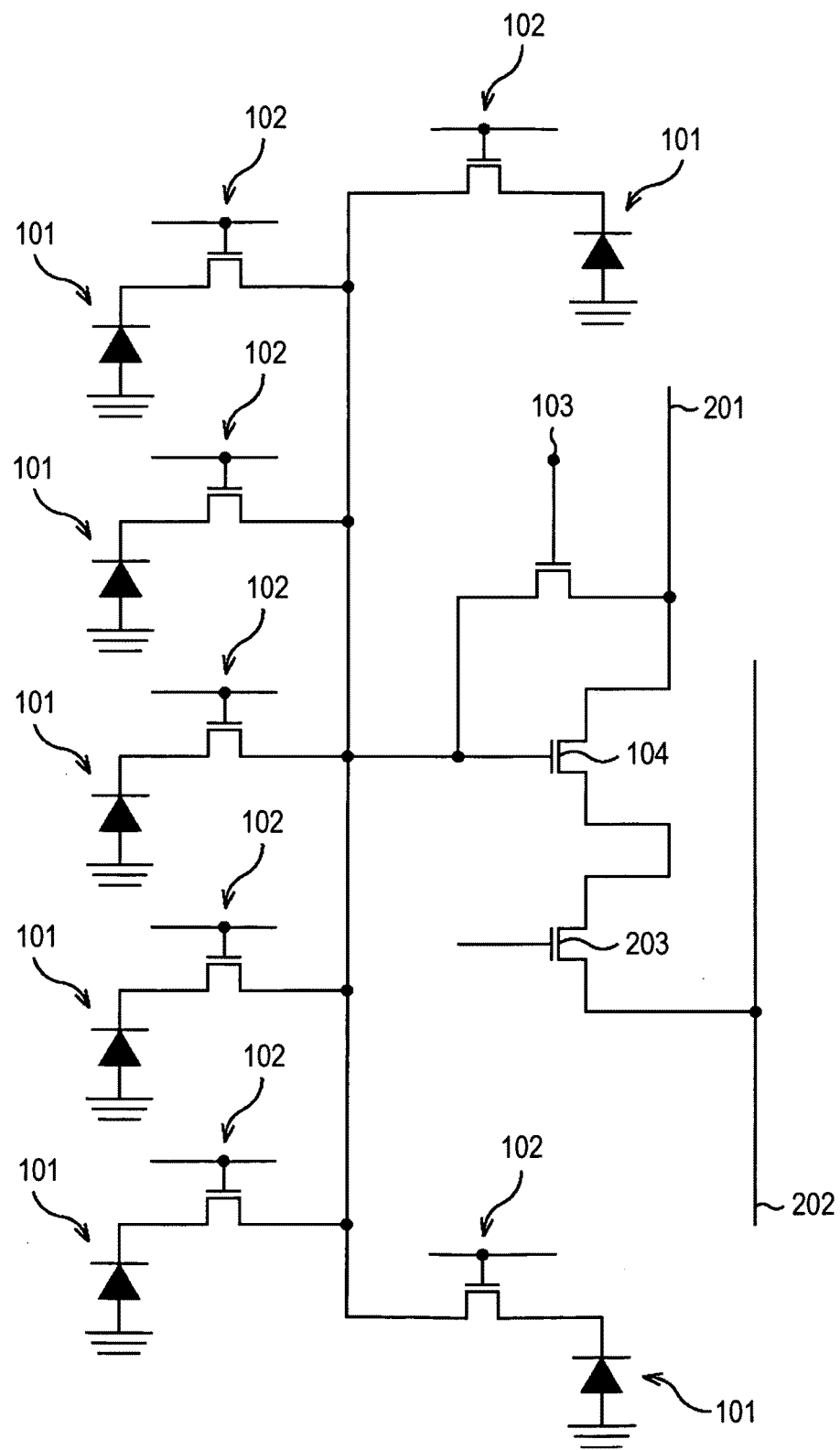
FIG. 5 is a diagram illustrating another circuit configuration of the image sensor with a honeycomb structure including 7 sharing pixels according to the embodiment of the invention.

FIG. 5 shows another circuit structure of the image sensor with the present honeycomb structure including 7 sharing pixels.

In the example shown in FIG. 5, a selection transistor 203 is further provided in addition to the structure shown in FIG. 4.

Figure 6:
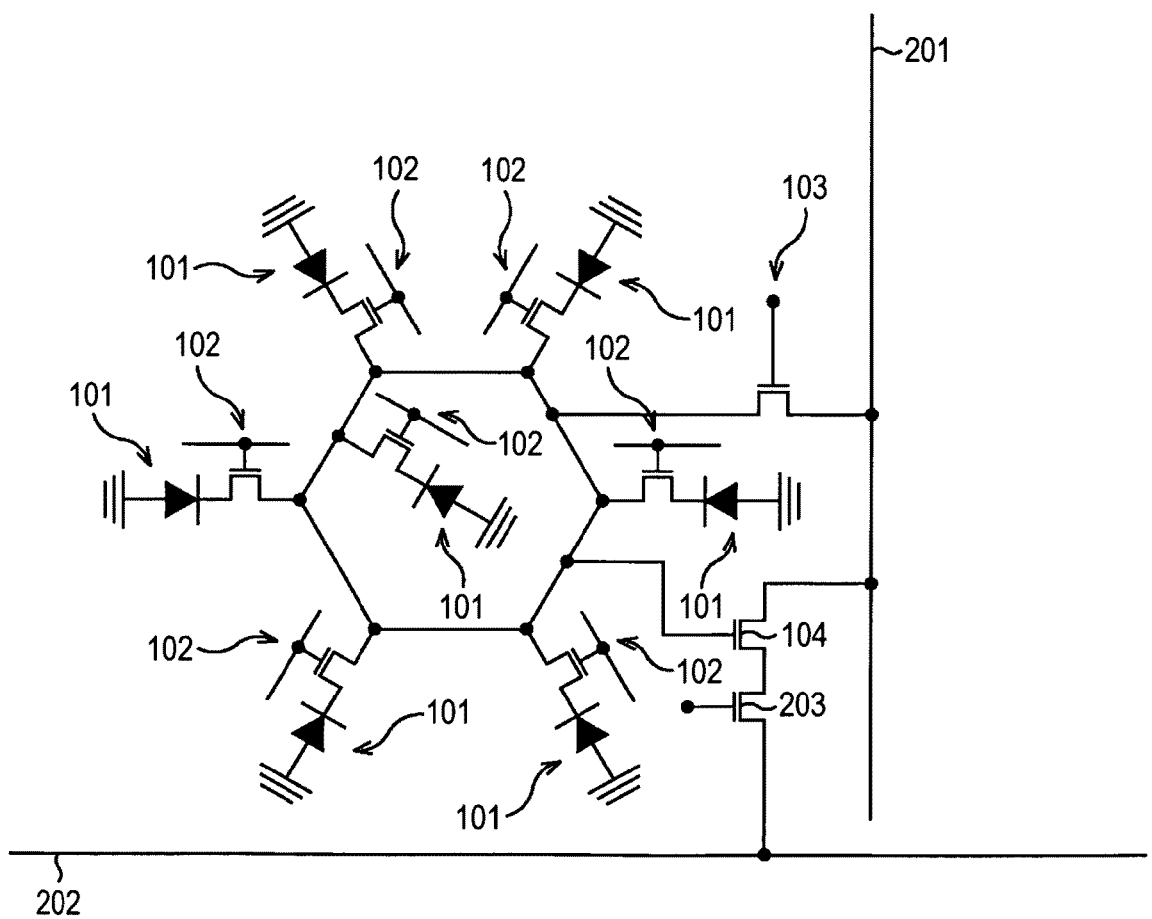
FIG. 6 is a diagram illustrating another circuit configuration of the image sensor with a honeycomb structure including 7 sharing pixels according to the embodiment of the invention.

FIG. 6 is another circuit structure of the image sensor with the present honeycomb structure including 7 sharing pixels.

In the example shown in FIG. 6, the connection type of the transmission transistor 102 of each pixel 101 is different from that of the example shown in FIG. 5. Although not shown, the selection transistor 203 can be removed by employing the same FD driving method as shown in FIG. 4.

Operations of the image sensor with the present honeycomb structure including 7 sharing pixels will be described now.

Figure 7:
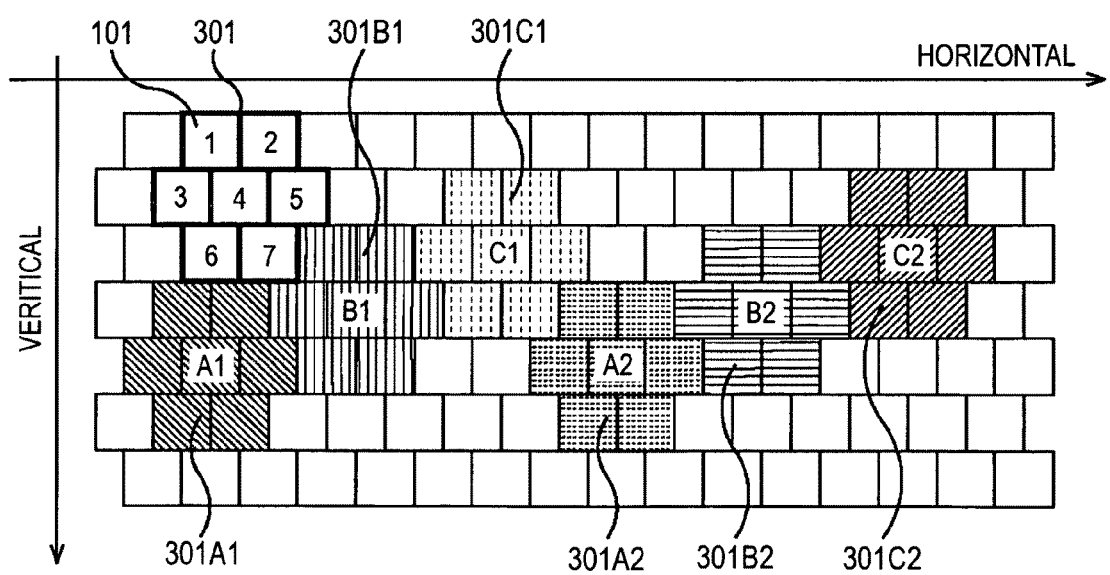
FIG. 7 is a diagram illustrating an image data reading process in the image sensor with a honeycomb structure including 7 sharing pixels according to the embodiment of the invention.

FIG. 7 is a diagram illustrating a process (hereinafter, referred to as "image data reading process") of causing the image sensor with the present honeycomb structure including 7 sharing pixels to read image data.

As shown in FIG. 7, one unit 301 includes seven pixels 101. Here, the number k (where k is an integer of 1 to 7) described in the pixels 101 shown in FIG. 7 is referred to as inter-unit pixel number k. The pixel 101 with the inter-unit pixel number k is referred to as pixel 101-$k$.

Paying attention to one unit 301, data of the pixels 101 are read sequentially in the order of the inter-unit pixel number k, that is, in the order of pixels 101-1 to 101-7 in the example shown in FIG. 7.

Paying attention to one specific unit 301A1, the right-neighboring unit 301B1 thereof is misaligned therewith by one pixel (one row) in the vertical direction in the drawing. The right-neighboring unit 301C1 thereof is misaligned with the unit 301A1 by two pixels (two rows) in the vertical direction in the drawing. The right-neighboring unit 301A2 thereof is arranged in the same row as the unit 301A1. Accordingly, paying attention to the unit 301A2, the right-neighboring unit 301B2 thereof is misaligned therewith by one pixel (one row) in the vertical direction in the drawing. The right-neighboring unit 301C2 thereof is misaligned with the unit 301A2 by two pixels (two rows) in the vertical direction in the drawing. The arrangement of three units 301Aj to 301Cj is repeated thereafter. Here, in the example shown in FIG. 7, j=1 and 2 are shown, but j is an integer equal to or less than a threshold value set on the basis of the total number of pixels. Hereinafter, j is referred to as 3-unit unit number. Accordingly, the reading of data from the units 301 is sequentially carried out in the arrangement order, that is, in the order of the units 301Aj to 301Cj in the example shown in FIG. 7.

In other words, the image sensor with the present honeycomb structure including 7 sharing pixels has a circuit structure in which signal transmission lines are arranged in the vertical and horizontal directions so as to read data in the above-mentioned order.

Figure 8:
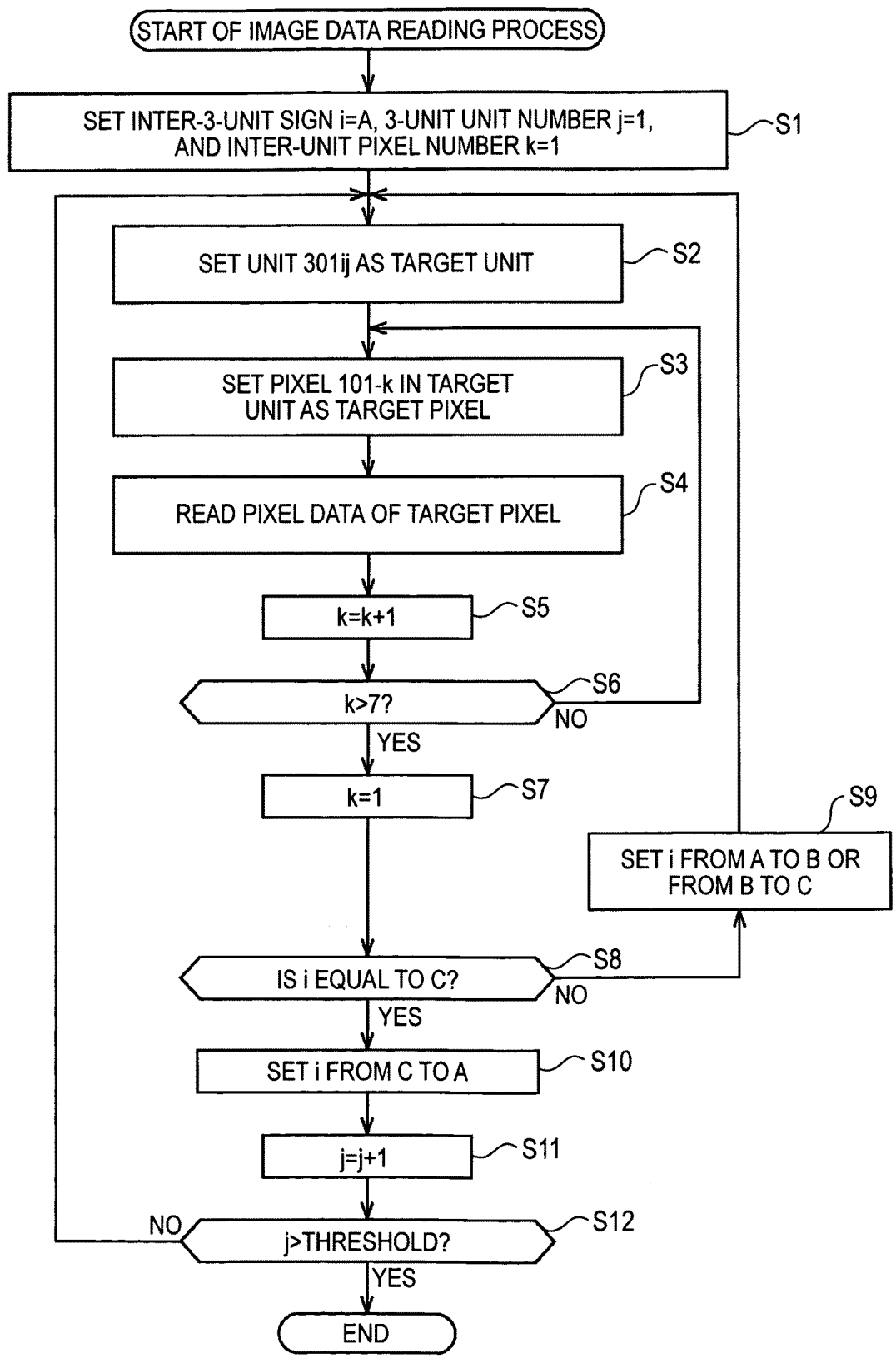
FIG. 8 is a flowchart illustrating a pixel data reading process shown in FIG. 7.

FIG. 8 is a flowchart illustrating the pixel data reading process in the example shown in FIG. 7.

In step S1, the image sensor with the present honeycomb structure including 7 sharing pixels (hereinafter, abbreviated as sensor in the description with reference to FIG. 8) sets the inter-3-unit sign to i=A, sets the 3-unit unit number to j=1, and sets the inter-unit pixel number to k=1.

Here, the inter-3-unit sign i means a sign (any one of A to C) attached to the reference numeral of a unit "301" in FIG. 7. The 3-unit unit number j is as defined above. That is, by describing the unit 300$ij$, a unique unit is specified. The inter-unit pixel number k is as defined above. That is, a unique pixel in the unit 300$ij$ is specified by the pixel 101-$k$. In other words, by specifying three parameters of i, j, and k, a predetermined pixel 101 is specified.

In step S2, the sensor sets the unit 301$ij$ as a target unit.

In step S3, the sensor sets the pixel 101-$k$ in the target unit as a target pixel.

In step S4, the sensor reads pixel data of the target pixel.

In step S5, the sensor increases the inter-unit pixel number k by 1 (k=k+1).

In step S6, the sensor determines whether k>7 is satisfied.

When it is determined that the inter-unit pixel number k is equal to or less than 7, the sensor repeats the processes from step S3. That is, the loop process of steps S3 to S6 is repeatedly performed on the pixels 101-1 to 101-7 in the target unit. As a result, the pixel data is sequentially read in the order of the pixels 101-1 to 101-7.

When the pixel data of the pixel 101-7 is read, k=8 is obtained in the process of step S5. Accordingly, YES is determined in step S6 and the process of step S7 is then performed.

In step S7, the sensor resets the inter-unit pixel number k to 1 (k=1).

In step S8, the sensor determines whether the inter-3-unit sign i is C.

When the inter-3-unit sign i is A or B, NO is determined in step S8 and the process of step S9 is then performed.

In step S9, the sensor sets the inter-3-unit sign i from A to B or from B to C. Thereafter, the process of step S2 is performed again and the subsequent processes are repeated. That is, the loop process of steps S2 to S9 is repeatedly performed on the units 300Aj to 300Cj. As a result, the units 300Aj to 300Cj are sequentially set as the target unit and the pixel data is sequentially read in the order of the pixels 101-1 to 101-7 in each target unit.

When the pixel data of the pixel 101-7 in the unit 300Cj is read, k=8 is obtained in the process of step S5. Accordingly, YES is determined in step S6 and the process of step S7 is performed. In step S7, the inter-unit pixel number k is reset to 1 (k=1). Then, YES is determined in step S8 and the process of step S10 is performed. In step S10, the sensor sets the inter-3-unit sign i from C to A.

In step S11, the sensor increases inter-3-unit pixel number j by 1 (j=j+1).

In step S12, the sensor determines whether j>threshold value is satisfied.

When the 3-unit unit number j is equal to or less than the threshold value, the process of S2 is performed again and the processes subsequent thereto are repeated. That is, the pixel data is sequentially read using three units 300Aj to 300Cj as a unit. In the process of step S11 after the final pixel data is read, j is set greater than the threshold value. Accordingly, YES is determined in step S12 and the image data reading process is ended.

Figure 9:
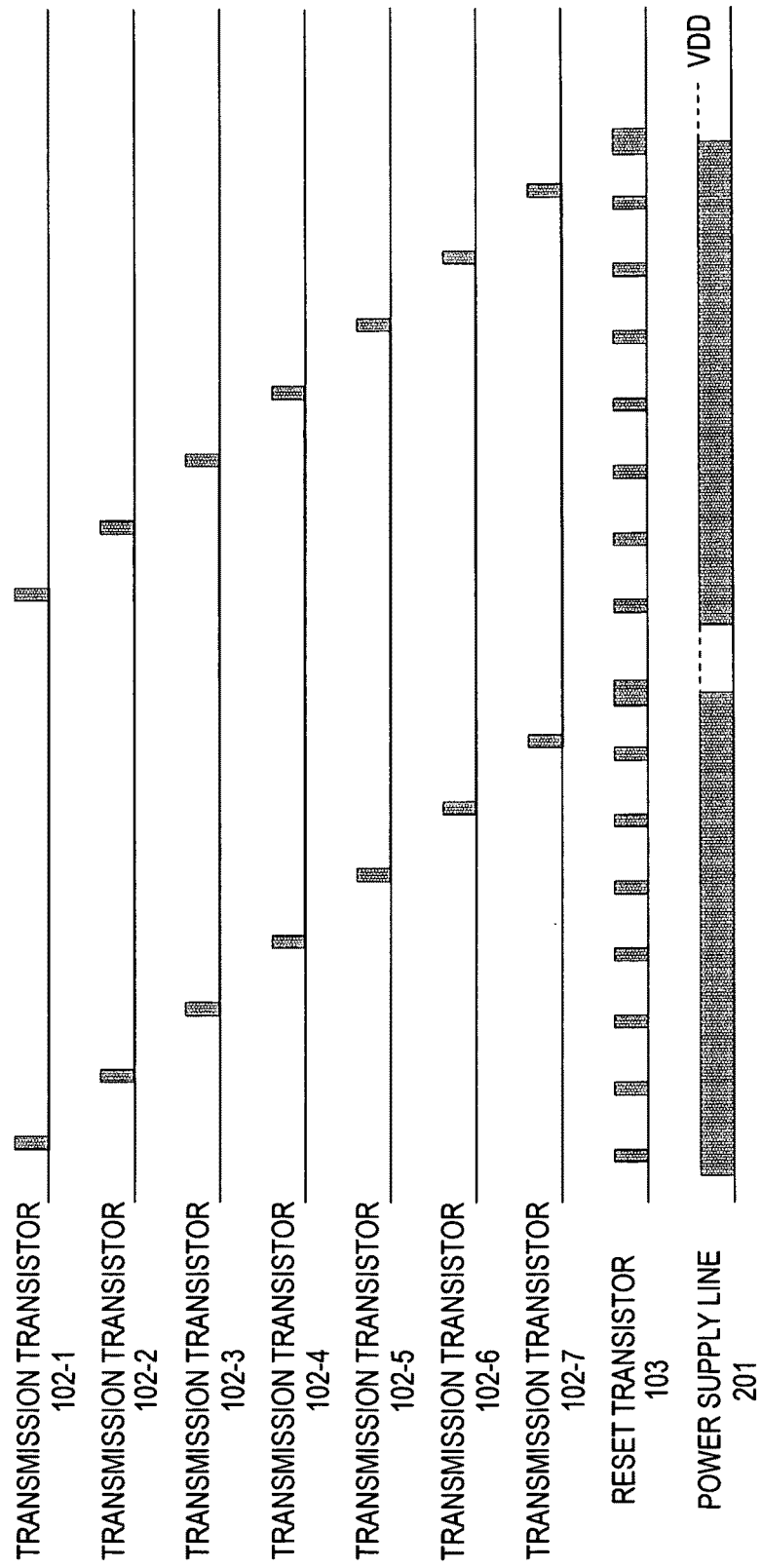
FIG. 9 is a timing diagram illustrating pixel data reading driving pulses in the pixel data reading process shown in FIG. 7.

FIG. 9 is a timing diagram illustrating image data reading driving pulses in the pixel data reading process in the example shown in FIG. 7.

FIG. 9 shows timing diagrams of the transmission transistors 102-1 to 102-7, the reset transistor 103, and the power supply line 201 from the upside. That is, the timing diagrams shown in FIG. 9 express the example shown in FIG. 4, that is, the example where the FD driving is carried out.

The driving pulses or the output times shown in FIG. 9 are only examples. That is, FIG. 9 does not exclude a case where the image sensor with the present honeycomb structure can operate in another driving mode.

In the example shown in FIG. 9, a pulse of potential VDD is supplied to the power supply line 201. That is, when the image data reading process on one unit 301 is started, the potential VDD is applied to the power supply line 201. In the description with reference to FIG. 9, when the potential VDD is applied to the power supply line 201, it is said that the VDD pulse is changed to an ON state. When the application of the potential is stopped, it is said that the VDD pulse is changed to an OFF state.

When the VDD is changed to the ON state and the reset transistor 103 is turned on, the FD potential is changed to a high level. Accordingly, when the transmission transistor 102-1 is turned on in this state, the photodiode of the pixel 101-1 gets empty and starts the accumulation of charges. By sequentially changing the reset transistor 103 and the transmission transistors 102-2 to 102-7 of the pixels 101-2 to 101-7 completely in the same way, the photodiodes sequentially start the accumulation of charges.

Thereafter, by turning on the reset transistor 103 at the time that the VDD pulse is changed from the ON state to the OFF state, the FD potential is changed to a low level.

Then, to read the charges accumulated in the photodiodes, the VDD pulse is changed again from the OFF state to the ON state. When the reset transistor 103 is turned on in this state and the transmission transistor 102-1 is turned on, the charged accumulated in the photodiode of the pixel 101-1 are read out to the FD, whereby the signal level (pixel data) is read out. Completely in the same way, the reset transistor 103 and the transmission transistors 102-2 to 102-7 of the pixels 101-2 to 101-7 are sequentially turned on. Accordingly, the charges (pixel data) of the photodiodes are sequentially read out.

Thereafter, by turning on the reset transistor 103 at the time that the VDD pulse is changed to ON state to the OFF state, the FD potential gets full and the reading (transmission) of the pixel data of the pixels 101-2 to 101-7 in one unit 301 is ended.

That is, the charge accumulation time of the pixels 101-1 to 101-7 in one unit 301 corresponds to the period of time from the first-bullet pulses of the transmission transistors 102-1 to 102-7 to the second-bullet pulses of the transmission transistors 102-1 to 102-7.

By performing the FD driving operation in accordance with the timing diagrams shown in FIG. 9 in this way, the loop process of steps S3 to S6 on the target unit is performed in the image data reading process shown in FIG. 8.

That is, the FD driving operation in accordance with the timing diagrams shown in FIG. 9 is performed on the units 301.

Figure 10:
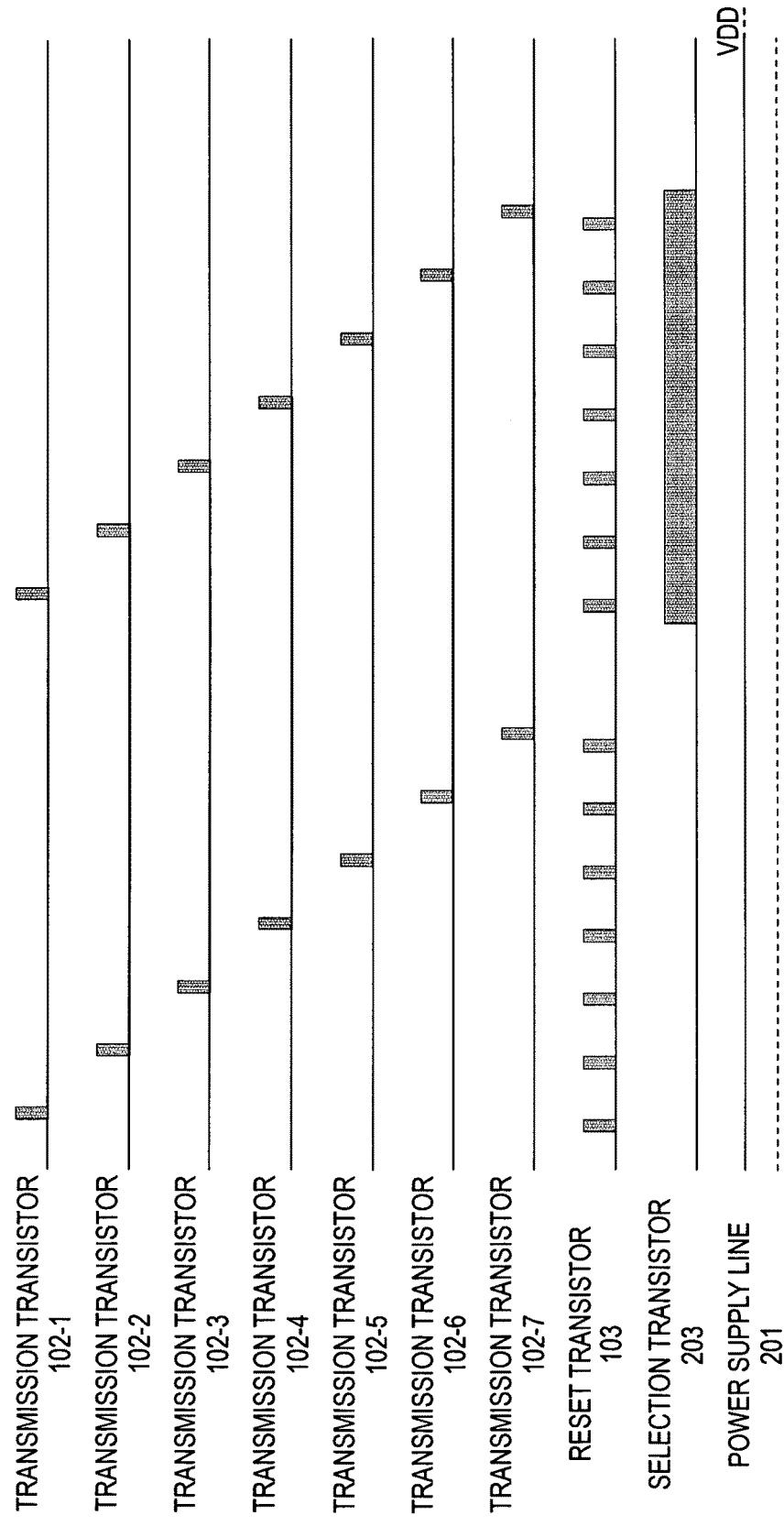
FIG. 10 is a timing diagram illustrating other pixel data reading driving pulses in the pixel data reading process shown in FIG. 7 and is different from the timing diagram of FIG. 9.

FIG. 10 is a timing diagram illustrating the pixel data reading driving pulses in the pixel data reading process in the example shown in FIG. 7 and is different from the example shown in FIG. 9.

FIG. 10 shows timing diagrams of the transmission transistors 102-1 to 102-7, the reset transistor 103, the selection transistor 203, and the power supply line 201 from the upside. That is, the timing diagrams shown in FIG. 10 express the example shown in FIG. 5 or 6, that is, the example where the normal driving is carried out.

The driving pulses or the output times shown in FIG. 10 are only examples. That is, FIG. 10 does not exclude a case where the image sensor with the present honeycomb structure can operate in another driving mode.

In the example shown in FIG. 10, the operations until the accumulation of charges in the photodiodes of the pixels 101-1 to 101-7 are basically the same as shown in FIG. 9 and thus description thereof is not repeated.

To read out the charges accumulated in the photodiodes of the pixels 101-1 to 101-7, the selection transistor 203 is turned on. When the reset transistor 103 is turned on in this state and the transmission transistor 102-1 is turned on, the charged accumulated in the photodiode of the pixel 101-1 are read out to the FD, whereby the signal level (pixel data) is read out. Completely in the same way, the reset transistor 103 and the transmission transistors 102-2 to 102-7 of the pixels 101-2 to 101-7 are sequentially turned on. Accordingly, the charges (pixel data) of the photodiodes are sequentially read out.

Thereafter, when the selection transistor 203 is turned off, the reading (transmission) of the pixel data from the pixels 101-2 to 101-7 in one unit 301 is ended.

That is, the charge accumulation time of the pixels 101-1 to 101-7 in the unit 301 corresponds to the period of time from the first-bullet pulses of the transmission transistors 102-1 to 102-7 to the second-bullet pulses of the transmission transistors 102-1 to 102-7.

By performing the FD driving operation in accordance with the timing diagrams shown in FIG. 10 in this way, the loop process of steps S3 to S6 on the target unit is performed in the image data reading process shown in FIG. 8.

Image Sensors with Present Honeycomb Structure Including 4 to 6 Sharing Pixels

The structure including 7 sharing pixels has been exemplified as the image sensor with the present honeycomb structure. However, the structure including 7 sharing pixels is not necessary, but a structure including 4 or more sharing pixels can be sufficiently employed. Accordingly, specific examples of the structures including 6, 5, and 4 sharing pixels will be sequentially described below in this order.

Figure 11:
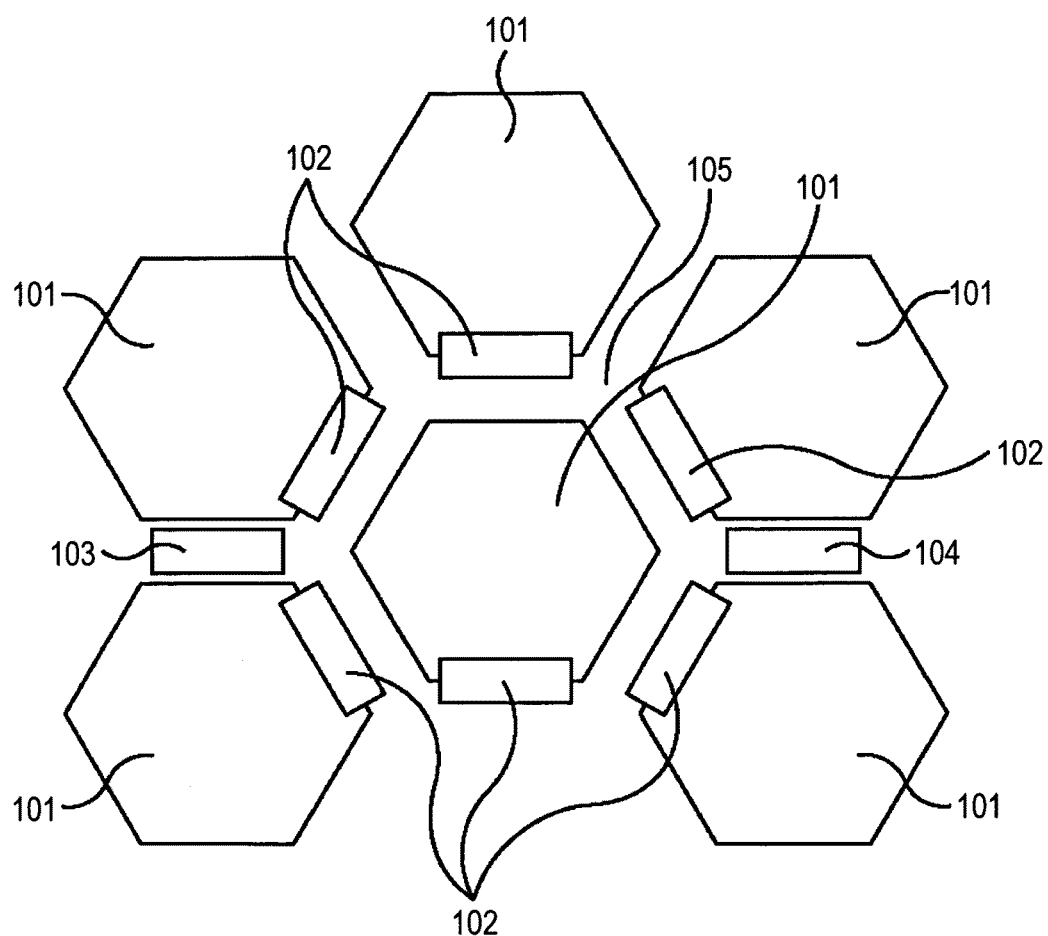
FIG. 11 is a diagram illustrating an arrangement of pixels in an image sensor with a honeycomb structure including 6 sharing pixels according to an embodiment of the invention.

FIG. 11 is a diagram illustrating a pixel arrangement of an image sensor with the present honeycomb structure including 6 sharing pixels.

In the example shown in FIG. 11, one unit of the present honeycomb structure is constructed by 6 pixels 101 in total of one pixel 101 at the center (which means the center of the structure including 7 sharing pixels) and five pixels 101 surrounding the center pixel.

The architecture shown in FIG. 11 employs a method of reading charges by the FD driving operation. Accordingly, a circuit structure in which the selection transistor is removed is obtained. However, it is needless to say that the circuit structure having the selection transistor may be employed.

That is, a structure obtained by removing the photodiode and the transmission transistor 102 corresponding to one pixel 101 from any structure shown in FIGS. 4 to 6 can be employed as the circuit structure of the image sensor with the present honeycomb structure including 6 sharing pixels.

Figure 12:
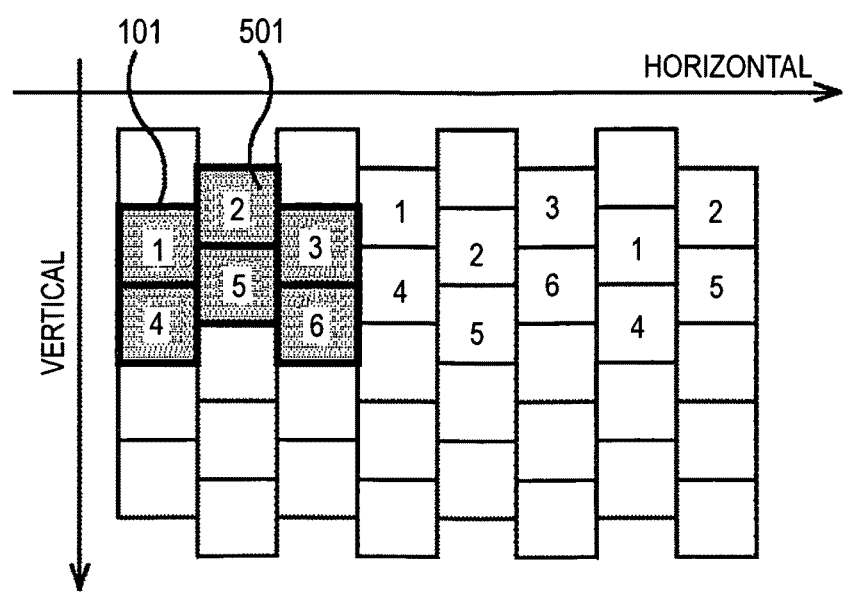
FIG. 12 is a diagram illustrating an image data reading process in the image sensor with a honeycomb structure including 6 sharing pixels according to the embodiment of the invention.

FIG. 12 is a diagram illustrating an image data reading process in the image sensor with the present honeycomb structure including 6 sharing pixels.

As shown in FIG. 12, one unit 501 includes six pixels 101-1 to 101-6. In addition, k in the pixel 101-*k* (k is an integer of 1 to 6 in the example shown in FIG. 12) represents a number described in each pixel shown in FIG. 12, that is, the inter-unit pixel number.

Paying attention to one unit 501, the reading of data from the pixels 101 is sequentially carried out in the order of the inter-unit pixel number k, that is, in the order of the pixels 101-1 to 101-6 in the example shown in FIG. 12. That is, the processes of steps S3 to S6 can be applied to the unit 501 without any change, only by changing the process of step S6 in FIG. 8 to the process of "k>6?". The timing diagrams of FIG. 9 or 10 can be applied without any change by omitting the timing diagram of the transmission transistor 102 corresponding to one pixel 101.

Figure 13:
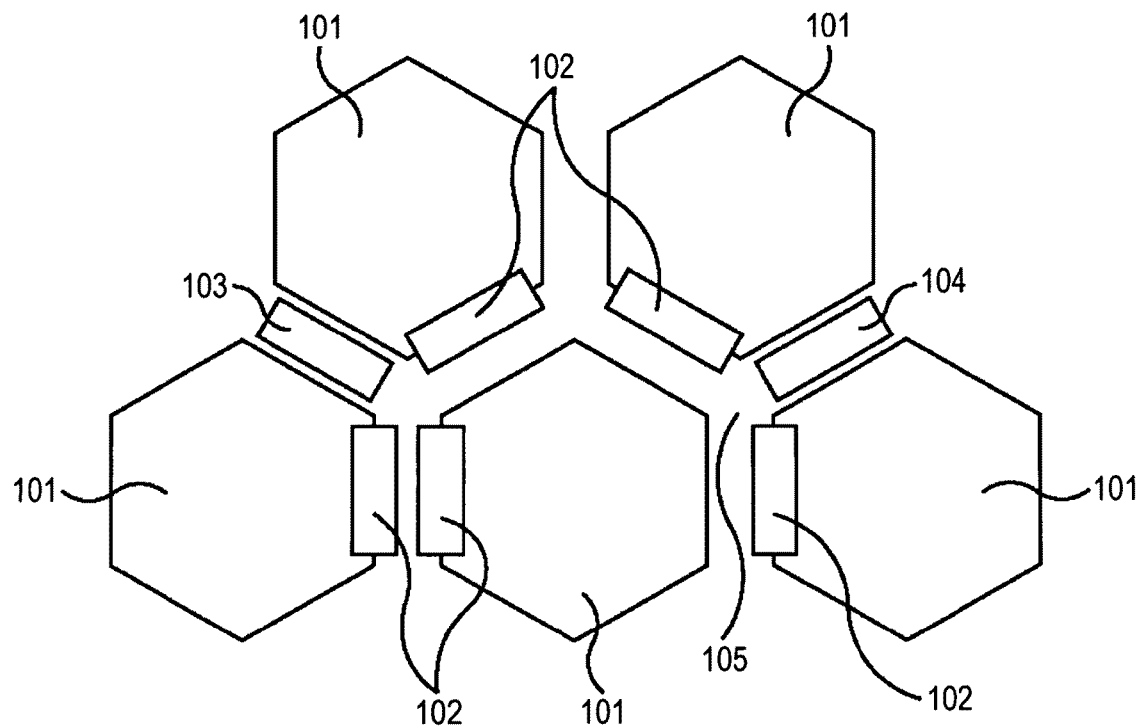
FIG. 13 is a diagram illustrating an arrangement of pixels in an image sensor with a honeycomb structure including 5 sharing pixels according to an embodiment of the invention.

FIG. 13 is a diagram illustrating a pixel arrangement of an image sensor with the present honeycomb structure including 5 sharing pixels.

In the example shown in FIG. 13, one unit of the present honeycomb structure is constructed by 5 pixels 101 in total of one pixel 101 at the center (which means the center of the structure including 7 sharing pixels) and four pixels 101 surrounding the center pixel.

The architecture shown in FIG. 13 employs a method of reading charges by the FD driving operation. Accordingly, a circuit structure in which the selection transistor is removed is obtained. However, it is needless to say that the circuit structure having the selection transistor may be employed.

That is, a structure obtained by removing the photodiodes and the transmission transistors 102 corresponding to two pixels 101 from any structure shown in FIGS. 4 to 6 can be employed as the circuit structure of the image sensor with the present honeycomb structure including 5 sharing pixels.

Figure 14:
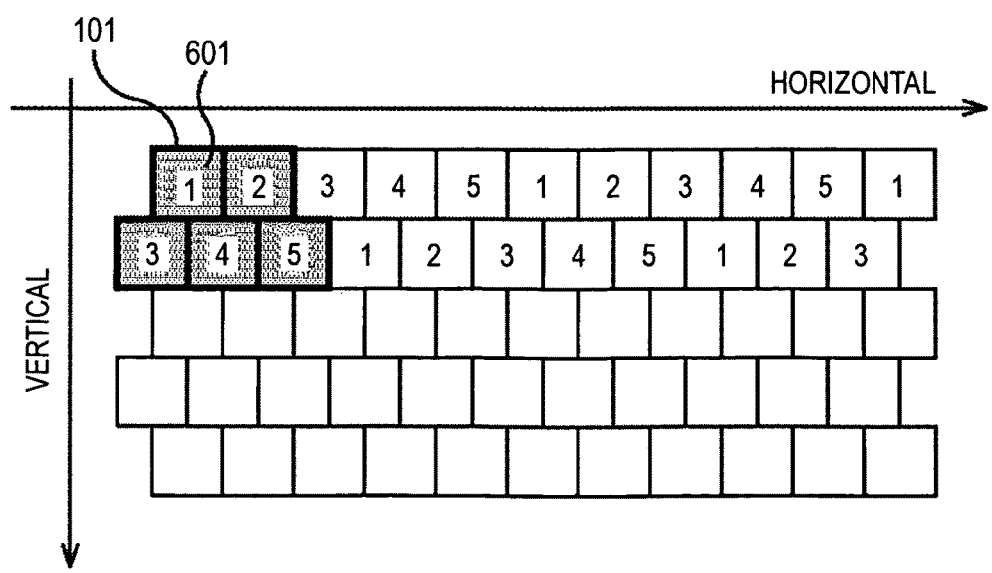
FIG. 14 is a diagram illustrating an image data reading process in the image sensor with a honeycomb structure including 5 sharing pixels according to the embodiment of the invention.

FIG. 14 is a diagram illustrating an image data reading process in the image sensor with the present honeycomb structure including 5 sharing pixels.

As shown in FIG. 14, one unit 601 includes five pixels 101-1 to 101-5. In addition, k in the pixel 101-$k$ (k is an integer of 1 to 5 in the example shown in FIG. 14) represents a number described in each pixel shown in FIG. 14, that is, the inter-unit pixel number.

Paying attention to one unit 601, the reading of data from the pixels 101 is sequentially carried out in the order of the inter-unit pixel number k, that is, in the order of the pixels 101-1 to 101-5 in the example shown in FIG. 14. That is, the processes of steps S3 to S6 can be applied to the unit 601 without any change, only by changing the process of step S6 in FIG. 8 to the process of "k>5?". The timing diagrams of FIG. 9 or 10 can be applied without any change by omitting the timing diagram of the transmission transistor 102 corresponding to two pixels 101.

Figure 15:
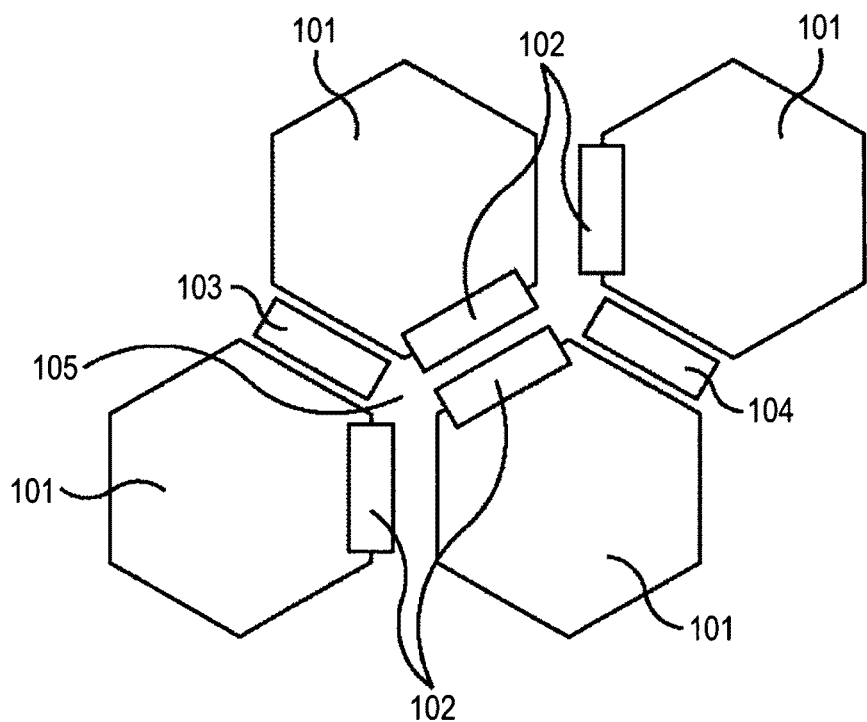
FIG. 15 is a diagram illustrating an arrangement of pixels in an image sensor with a honeycomb structure including 4 sharing pixels according to an embodiment of the invention.

FIG. 15 is a diagram illustrating a pixel arrangement of an image sensor with the present honeycomb structure including 4 sharing pixels.

In the example shown in FIG. 15, one unit of the present honeycomb structure is constructed by 4 pixels 101 in total of one pixel 101 at the center (which means the center of the structure including 7 sharing pixels) and three pixels 101 surrounding the center pixel.

The architecture shown in FIG. 15 employs a method of reading charges by the FD driving operation. Accordingly, a circuit structure in which the selection transistor is removed is obtained. However, it is needless to say that the circuit structure having the selection transistor may be employed.

That is, a structure obtained by removing the photodiodes and the transmission transistors 102 corresponding to three pixels 101 from any structure shown in FIGS. 4 to 6 can be employed as the circuit structure of the image sensor with the present honeycomb structure including 4 sharing pixels.

Figure 16:
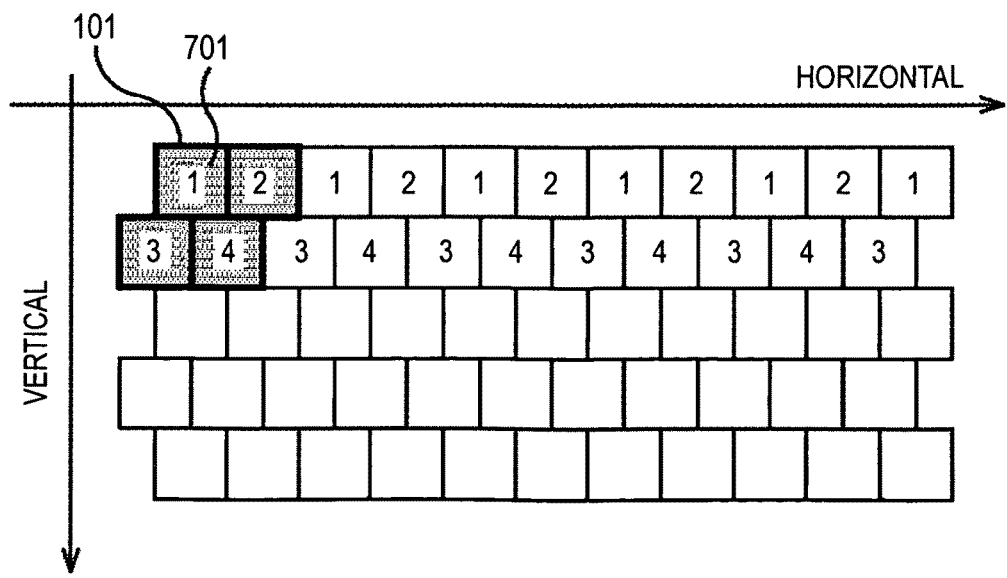
FIG. 16 is a diagram illustrating an image data reading process in the image sensor with a honeycomb structure including 4 sharing pixels according to the embodiment of the invention.

FIG. 16 is a diagram illustrating an image data reading process in the image sensor with the present honeycomb structure including 4 sharing pixels.

As shown in FIG. 16, one unit 701 includes four pixels 101-1 to 101-4. In addition, k in the pixel 101-$k$ (k is an integer of 1 to 4 in the example shown in FIG. 16) represents a number described in each pixel shown in FIG. 16, that is, the inter-unit pixel number.

Paying attention to one unit 701, the reading of data from the pixels 101 is sequentially carried out in the order of the inter-unit pixel number k, that is, in the order of the pixels 101-1 to 101-4 in the example shown in FIG. 16. That is, the processes of steps S3 to S6 can be applied to the unit 701 without any change, only by changing the process of step S6 in FIG. 8 to the process of "k>4?". The timing diagrams of FIG. 9 or 10 can be applied without any change by omitting the timing diagram of the transmission transistor 102 corresponding to three pixels 101.

Structure of On-Chip Lens Shared by Pixels

From the viewpoint of a decrease in size of a pixel, the present technique (at the filing time of the invention) has a limit to the processing precision of an on-chip lens. Accordingly, by using the past method, it is very difficult to manufacture a micron-sized lens with high precision or to manufacture a short-focus convex lens with a large curvature. The past method is a method of applying a resist of a mask pattern to an on-chip lens material, melting the resist by a thermal ref lowing process, forming a convex lens pattern using the surface tension thereof, and transferring shapes to the lens material by etching.

On the other hand, for example, a large unit including 7 sharing pixels can be employed as the unit (one unit) of sharing pixels in the image sensor with the present honeycomb structure. A larger unit, for example, a unit having a honeycomb structure of 19 pixels in total including 12 pixels surrounding the large unit, can be employed as one unit. In this way, the present honeycomb structure, a honeycomb structure including four or more pixels can be employed as one unit and one micro lens can be disposed for one unit. Accordingly, it is possible to easily implement a light-collecting element with a high degree of freedom corresponding to the lens processing precision. Incidentally, when one on-chip lens is employed for plural pixels, the micro lens collects the light flux from a subset of the exit pupil, whereby it is possible to grasp the focusing state of a subject or to acquire information in the depth direction. Therefore, it may be possible to realize the auto focus function of a TTL (Through The Lens) phase difference detecting type or a function of acquiring the depth information of the subject. A specific example of the on-chip lens shared by pixels or a specific example of a technique employing the on-chip lens will be described below.

Figure 17:
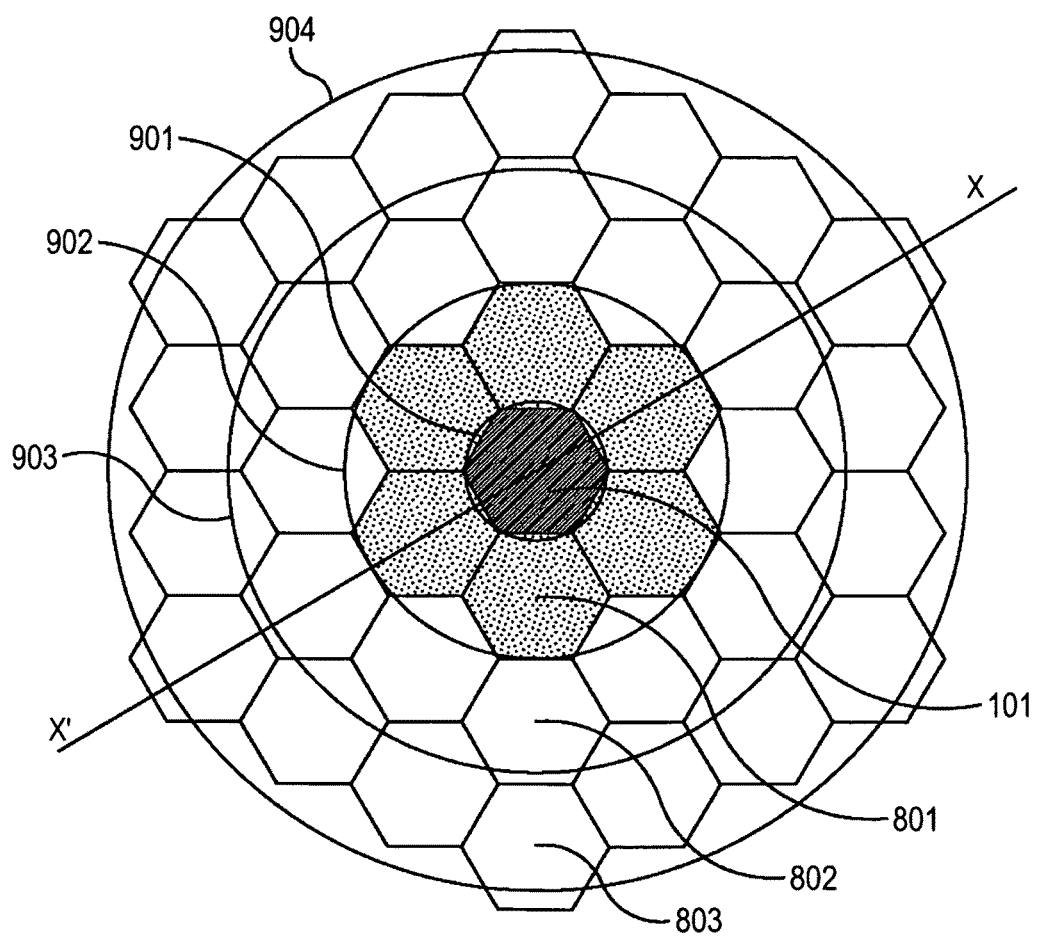
FIG. 17 is a diagram schematically illustrating a position relation between light-receiving elements (pixels) and light-collecting elements in the image sensor with a honeycomb structure according to an embodiment of the invention.

FIG. 17 is a diagram schematically illustrating a position relation between the light-receiving elements (pixels) and the light-collecting elements of the image sensor with the present honeycomb structure.

Here, one pixel 101 which is the center of one unit is referred to as "center pixel 101".

A unit 801 including 7 pixels 101 in total of a center pixel 101 and six pixels 101 surrounding the center pixel can be employed as one unit of the present honeycomb structure.

In this case, when the past technique is employed without any change, a structure in which one light-collecting element 901 (for example, an on-chip micro lens) is disposed for one pixel 101 is obtained. With this structure, when one pixel 101 decreases in size, it is necessary to reduce the size of the light-collecting element 901 by as much and it is difficult to cope with such a decrease in size with the present processing technique. That is, with the decrease in size of the light-receiving element of the pixel 101, the high processing precision of the light-collecting element 901 is necessary. When the on-chip micro lens is employed as the light-collecting element 901, the following method including first to fourth steps is employed as the present method of forming the on-chip micro lens. That is, in the first step, a lens pattern is formed in a resist applied to an on-chip lens material, the resist is melted by the thermal ref lowing, and a convex lens pattern is formed with the surface tension. In the second step, the on-chip lens is formed by transferring the convex lens pattern to the lens material by etching. In the method including the first and second steps, it is difficult to cope with the pixel size of several μm or less. The precision using this method reaches a limit.

Therefore, it is suitable that one light-collecting element 902 (for example, an on-chip micro lens) is employed for the unit 801 (seven pixels). In this way, by employing the light-collecting element shared by plural pixels, the precision lower than that accompanied with the decrease in size of a pixel can be sufficiently used as the processing precision of the light-collecting element. That is, any particular problem is not caused even when the present method of forming an on-chip lens is employed. It is effective to employ the light-collecting element shared by plural pixels in view of a decrease in individual difference of the light-collecting characteristic between the light-collecting elements or an improvement in stability of the light-collecting characteristic, compared with the case where the past light-collecting element in the unit of a pixel is employed.

One unit 802 having 19 pixels 101 in total including 12 pixels 101 surrounding the unit 801 may be employed. In this case, one light-collecting element 902 (for example, the on-chip micro lens) may be employed for the unit 802 (19 pixels).

One unit 803 having 37 pixels 101 in total including 18 pixels 101 surrounding the unit 802 may be employed. In this case, one light-collecting element 903 (for example, the on-chip micro lens) may be employed for the unit 803 (37 pixels).

That is, the honeycomb structure including the pixels 101 surrounding the center pixel 101 with M folds (where M is an integer of 1 or greater) can be employed as one unit. In this case, one light-collecting element (for example, an on-chip micro lens) can be employed for each unit. In other words, a honeycomb structure including pixels on a circumference having a radius a predetermined distance apart by a neighboring pixel pitch (distance between the neighboring pixels) from the center pixel 101 or inside the circumference can be employed as one unit. Here, when it is assumed that the neighboring pixel pitch is unit distance 1, the total number N of pixels 101 existing in the range apart by X pixels or less from the center pixel 101 can be expressed by $N=1+\Sigma(6 \times X)$ (where $\Sigma$ is the total sum in the range of X=0 to x). That is, one unit includes N pixels 101 and one light-collecting element is shared by the N pixels 101. Here, one unit means a unit of the honeycomb structure in which one light-collecting element is arranged and may not correspond to the unit in which the transistors are shared in the one-to-one correspondence.

The light-collecting element is not particularly to the on-chip micro lens (micro convex lens). For example, a sub-wavelength lens (SWLL) may be employed as the light-collecting element. Here, the sub-wavelength lens means the following element. That is, the sub-wavelength lens is an element obtained by performing a micro processing process on an optical element with a refractive index n (where n>1) with a scale significantly smaller than a wavelength of an electronic wave to which the pixels have the sensitivity. More accurately, by controlling a volume ratio of air (of which the refractive index is 1) and the optical element in a micro volume of such an element, an optical element of a two-dimensional refractive index distribution with a gradual variation in refractive index is embodied. As a result, the optical element forms an optical element with a light-collecting function. This light-collecting element is the sub-wavelength lens.

Figure 18:
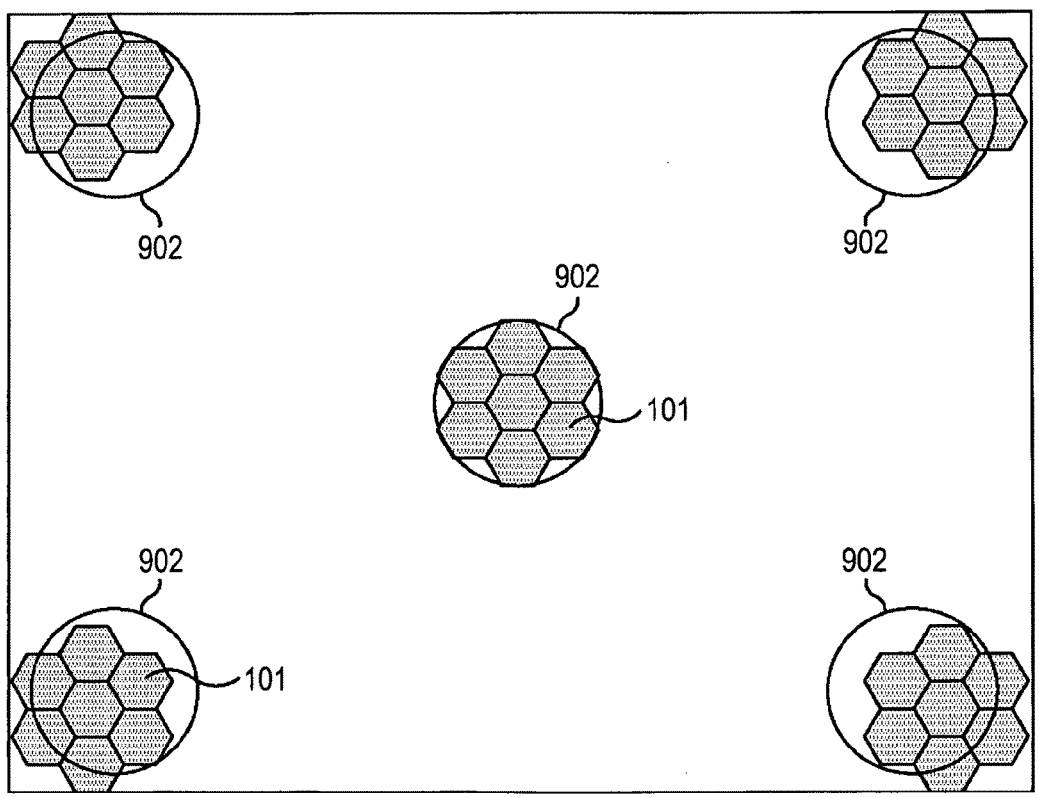
FIG. 18 is a top view illustrating an arrangement of pixels in the image sensor with a honeycomb structure according to the embodiment of the invention.

FIG. 18 is a top view illustrating a pixel arrangement of the image sensor with the present honeycomb structure.

In the example shown in FIG. 18, for the purpose of easy explanation, only a part of a unit 902 (hereinafter, referred to as "light-collecting element arrangement unit") in which a honeycomb structure unit (hereinafter, referred to as "pixel unit") including 7 pixels 101 and one light-collecting element are arranged is drawn. That is, actually, all the pixels of the image sensor with the present honeycomb structure are arranged in a honeycomb shape.

As shown in FIG. 18, the arrangement relation between the pixel unit and the light-collecting element arrangement unit 902 can be set so that the optical axis of the light-collecting element is aligned with the center of the pixel unit without eccentricity in the central area of the image sensor with the present honeycomb structure and the optical axis of the light-collecting element is eccentrically aligned with the center of the pixel unit in the circumferential area. Accordingly, it is possible to efficiently collect tilted incident light components in the circumferential area of the image sensor with the present honeycomb structure, thereby reducing the limb darkening (shading). In the example shown in FIG. 18, one light-collecting element is arranged for one light-collecting element arrangement unit 902. However, one light-collecting element may be arranged for one pixel 101 or one light-collecting element may be arranged for more pixels 101.

Use of On-Chip Lens Shared by Pixels: Detection of Phase Difference

A method of performing a phase difference detecting function will be described as a usage example where one light-collecting element is employed for one unit of the present honeycomb structure.

FIG. 19, FIGS. 20A and 20B, FIG. 21, and FIG. 22 are diagrams illustrating the method of performing a phase difference detecting function.

In FIGS. 19 to 22, points 1501A and 1501B represent one specific point in a subject, for example, a point light source. A camera lens group 1502, a light-collecting element group 1503, and a light-receiving element array 1504 are arranged sequentially from the points 1501A and 1501B, that is, from the left of the drawing. The light-receiving element array 1504 means a set of pixels 101 (photodiodes) arranged in the present honeycomb structure. That is, the rectangles constituting the light-receiving element array 1504 represent one pixel, 101, respectively. Here, the unit 801 shown in FIG. 17 is employed and the light-collecting element 902 corresponds to one element of the light-collecting element group 1503. One light-collecting element 902 of the light-collecting element group 1503 corresponds to three opposing pixels 101. That is, the "three opposing pixels 101" means three pixels 101 in the section taken along line X-X' of FIG. 17, that is, three colored pixels 101 including the pixel 101C.

In the examples shown in FIGS. 19 to 22, the number of pixels in the section taken along line X-X' is three for the purpose of convenient explanation. That is, as described with reference to FIG. 17, the number of pixels in the section taken along line X-X' may be five or seven or more.

Figure 19:
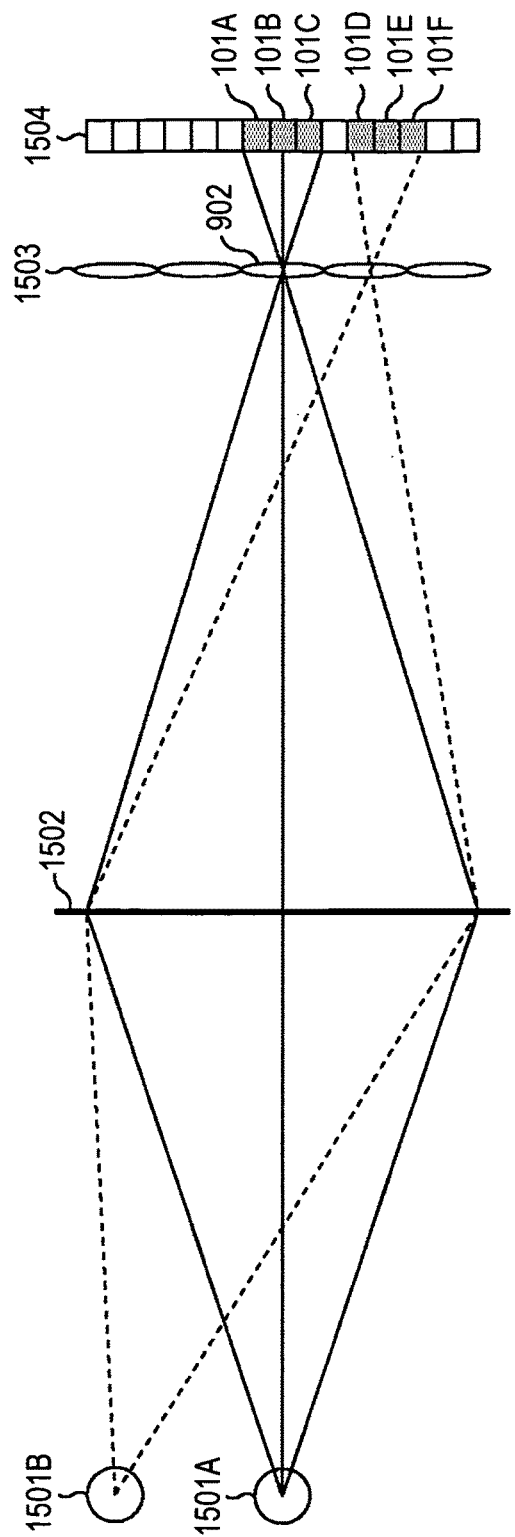
FIG. 19 is a diagram illustrating a method of performing a phase difference detecting function.
Figure 20:
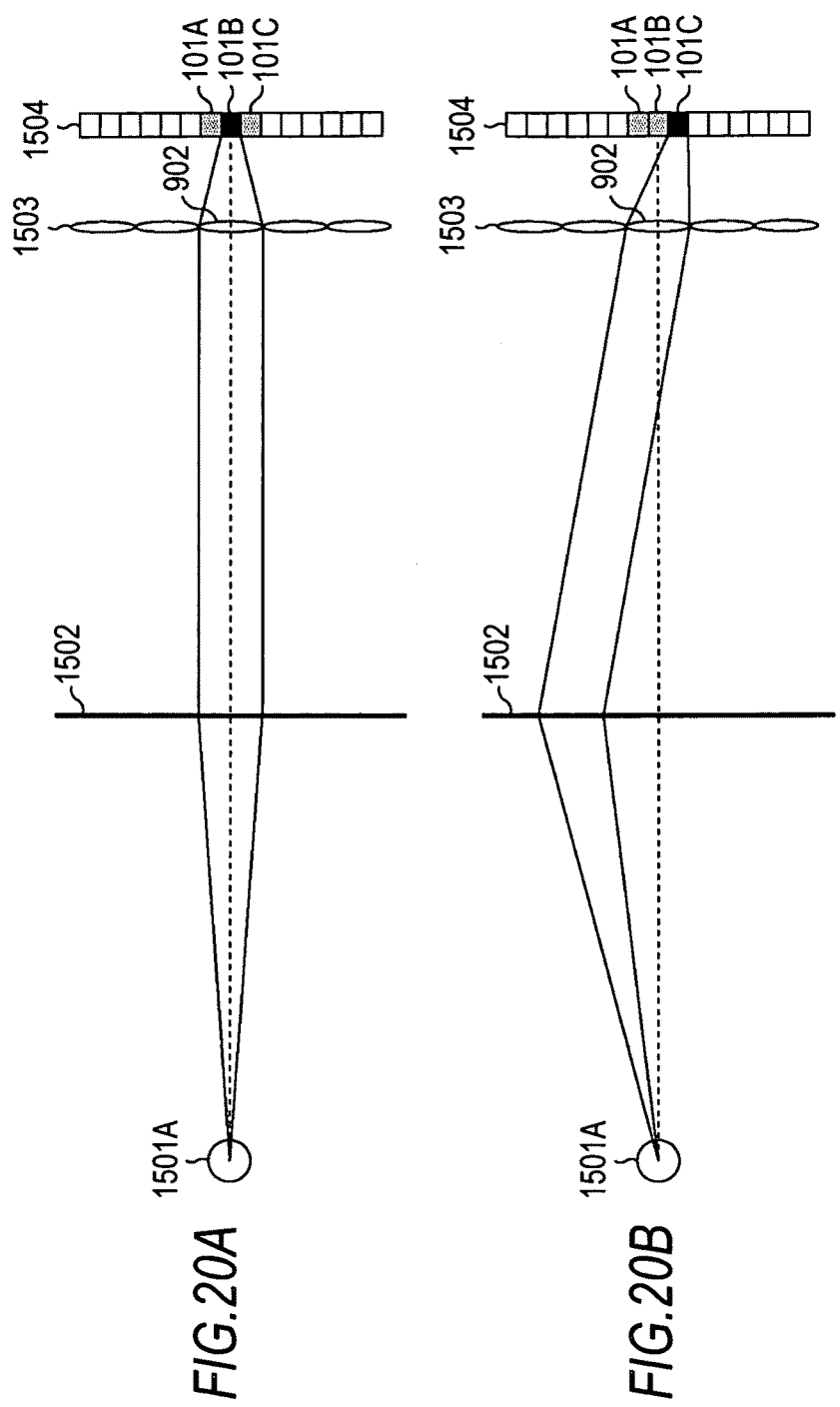
FIGS. 20A and 20B are diagrams illustrating a method of performing a phase difference detecting function.

As shown in FIG. 19, light from the point 1501A of the subject is collected by the lens group 1502, is focused on one light-collecting element 902, and is formed as an image, for example, in the pixels 101A to 101C. Similarly, light from the point 1501B of the subject is focused on one light-collecting element 902 by the lens group 1502 and is formed as an image, for example, in the pixels 101D to 101F.

FIGS. 20A and 20B show the position relation under the condition (so-called under a focused condition) that the light is focused on the point 1501A of the subject.

Out of the light from the point 1501A of the subject, the light incident on the central area of the lens group 1502 is propagated as shown in FIG. 20A. That is, the light is collected by the lens group 1502, is focused on one light-collecting element 902, and is formed as an image, for example, in the center pixel 101B (the center pixel 101 in FIG. 17) out of three pixels 101A to 101C opposed to the light-collecting element 902.

Out of the light from the point 1501A of the subject, the light incident on the upper area of the lens group 1502 in FIG.

20B is propagated as shown in FIG. 20B. That is, the light is collected by the lens group 1502, is focused on one light-collecting element 902, and is formed as an image, for example, in the lower pixel 101C in FIG. 20B out of three pixels 101A to 101C opposed to the light-collecting element 902.

Out of the light from the point 1501A of the subject, the light incident on the lower area of the lens group 1502 in FIGS. 20A and 20B is propagated as follows, not shown. That is, the light is collected by the lens group 1502, is focused on one light-collecting element 902, and is formed as an image, for example, in the upper pixel 101A in FIGS. 20A and 20B out of three pixels 101A to 101C opposed to the light-collecting element 902.

In this way, out of the light from the subject, the light from a part of an aperture (sub aperture) of the lens group 1502 selectively reaches the pixels 101 (the light-receiving elements).

Figure 21:
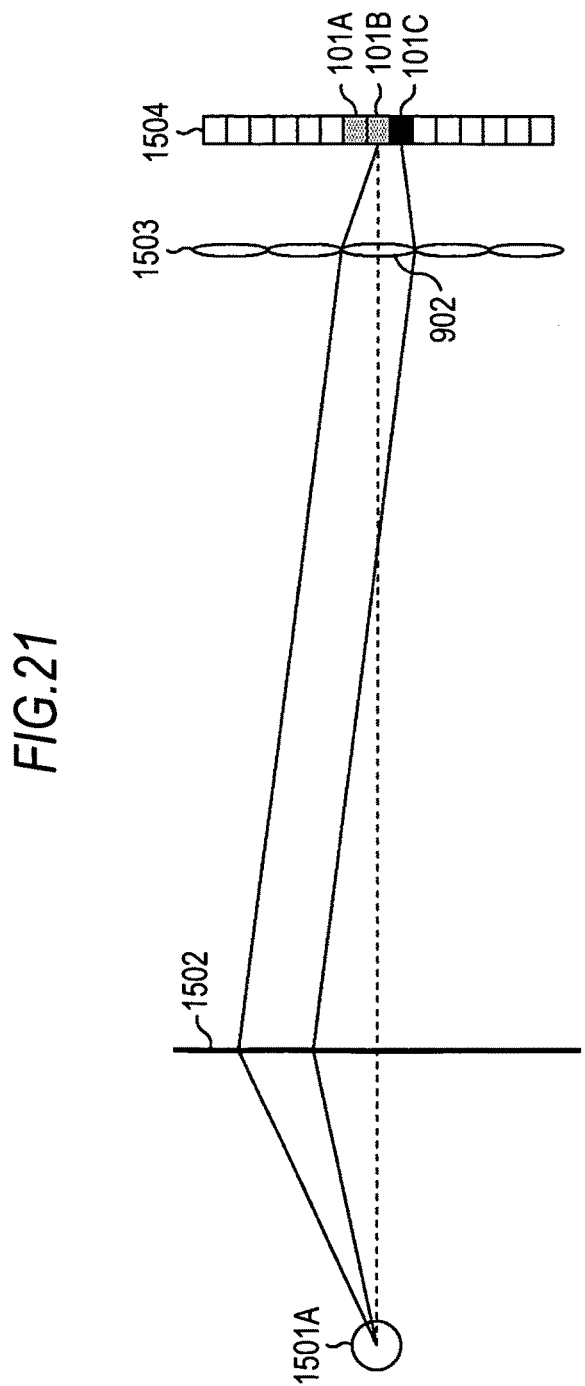
FIG. 21 is a diagram illustrating a method of performing a phase difference detecting function.

FIG. 21 shows the position relation under a condition where the light is focused in front of the point 1501A of the subject (so-called under a front pinning condition).

In this case, out of the light from the point 1501A of the subject, the light formed as an image in the center pixel 101B (the center pixel 101 in FIG. 17) under the focusing condition shown in FIGS. 20A and 20B is focused on an area slightly upper than the lower pixel 101C in FIG. 21.

Figure 22:
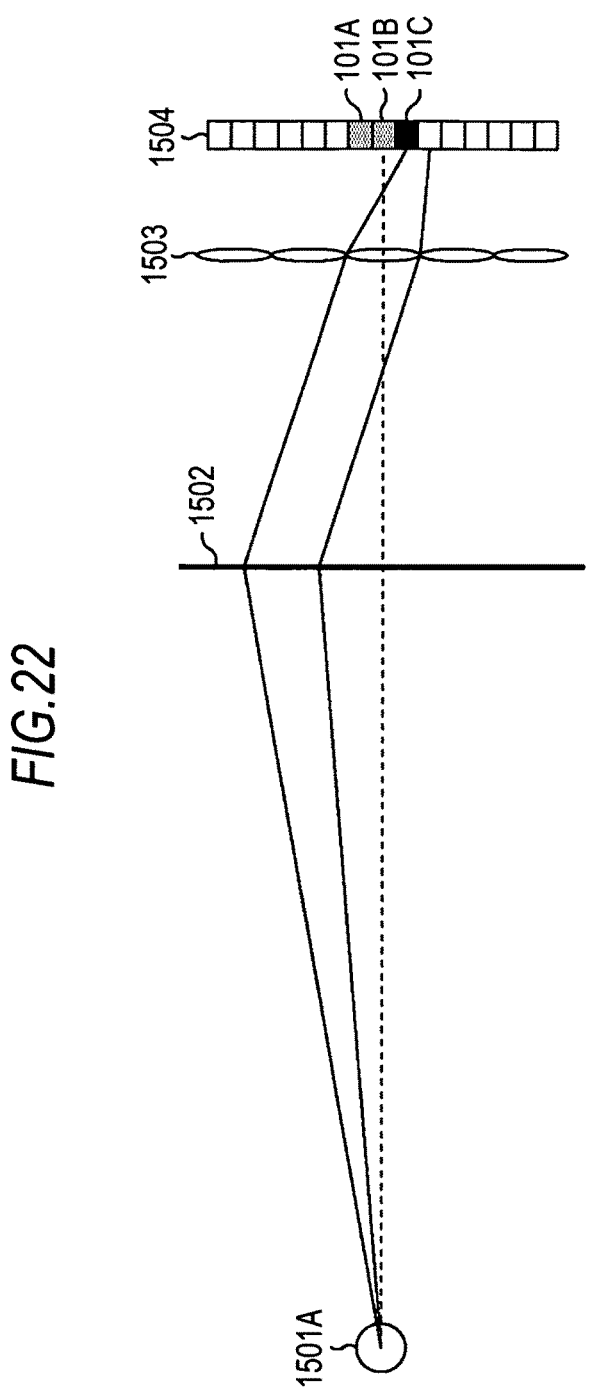
FIG. 22 is a diagram illustrating a method of performing a phase difference detecting function.

FIG. 22 shows the position relation under a condition where the light is focused in the rear of the point 1501A of the subject (so-called under a rear pinning condition).

In this case, out of the light from the point 1501A of the subject, the light formed as an image in the center pixel 101B (the center pixel 101 in FIG. 17) under the focusing condition shown in FIGS. 20A and 20B is focused on an area slightly lower than the lower pixel 101C in FIG. 22.

In this way, when one light-collecting element 902 is arranged for plural pixels 101, the light through a part of the aperture (sub aperture) of the lens group 1502 out of the light from the subject selectively reaches the pixels 101. The image-forming position of the selectively-reached light is shifted depending on the focused position. Accordingly, by comparing the light intensity values of the plural pixels 101, it is possible to determine the focusing position. As a result, it is possible to easily perform the auto focus function of detecting a phase difference. In the image sensor with the present honeycomb structure, the light-collecting elements 902 covering the plural pixels are arranged on the entire surface of the pixels 101. Accordingly, the image sensor can be easily applied to a three-dimensional camera (light field camera) which can perform a re-focusing process as an after-process after capturing an image.

As described above, when one light-collecting element 902 is arranged for plural pixels 101, the position relation between the exit pupil of the lens group 1502 including a main imaging lens and the pixels 101 (light-receiving elements) is substantially conjugated (substantially focused) by the light-collecting element 902. The distance from the exit pupil of the lens group 1502 to the light-collecting element 902 is much greater than the distance from the light-collecting element 902 to the pixels 101. The pixels 101 are arranged substantially on the focal plane of the light-collecting element 902. Accordingly, each pixel 101 receives the light flux from an eccentric subset of the lens group 1502 through the light-collecting element 902. Accordingly, it is possible to detect a phase difference in an object before or after the focusing position of the image sensor with the present honeycomb structure or to acquire distance information to the object.

Color Reproduction of Image Sensor with Present Honeycomb Structure

Figure 23:
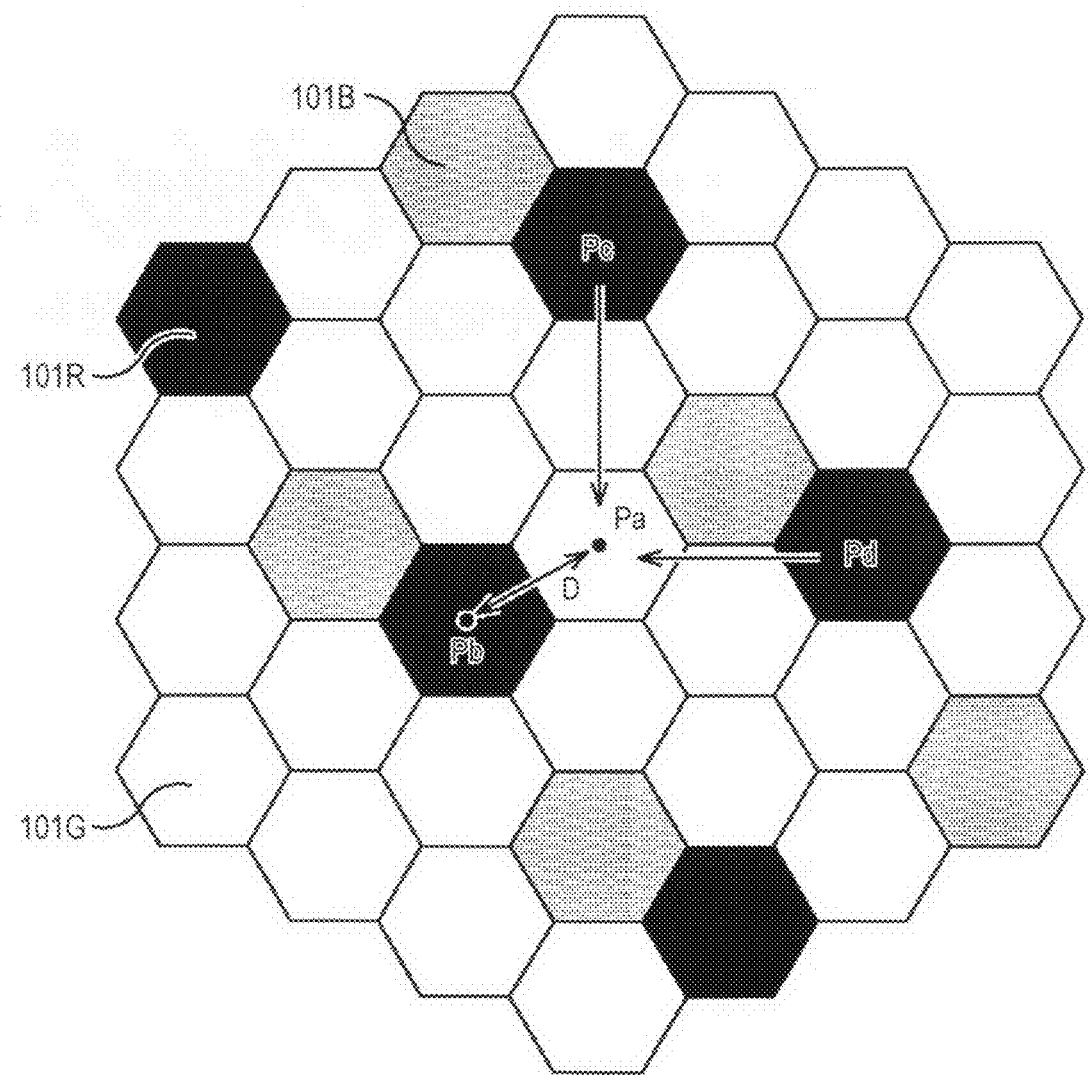
FIG. 23 is a diagram illustrating a de-mosaicking process when pixels include different color filters.

FIG. 23 is a diagram illustrating a de-mosaicking process when the pixels 101 have different color filters.

In a monochromatic image sensor or an image sensor in which one pixel is sensitive to plural colors (plural wavelengths), for example, an image sensor such as Foveon X3 separating the colors in the stacking direction of silicon, the de-mosaicking process may not be necessary. However, general image sensors often have RGB filters or complementary color filters. When the image sensor with the present honeycomb structure is applied to such image sensor, the de-mosaicking process may be necessary for reproducing the colors so as for the pixels 101 to hold the color information of three colors.

In the past image sensor with the square matrix structure shown in FIG. 1A, that is, in the image sensor with the square matrix structure having a uniform pixel size, when the distance between the neighboring pixels is D (of which the unit is arbitrary), the distance from a target pixel apart by N pixels in the X axis direction and the Y axis direction is an integral multiple of D.

On the other hand, in the image sensor with the present honeycomb structure, when the distance between the neighboring pixels is D, the distance to the pixel 101 separated by two pixels from the target pixel 101 is 2D or $\sqrt{3}$D. That is, depending on the position relation with the target pixel 101, the ratio of the pixel pitch is not a simple integral multiple. Accordingly, when the de-mosaicking process is carried out, the calculation amount may be great to accurately calculate the pixel pitch.

Therefore, as a method of reducing the calculation amount of the de-mosaicking process, the inventor invented a method of approximating the distance between the neighboring pixels with an integral ratio.

In the example shown in FIG. 23, the de-mosaicking process in the image sensor of three colors of RGB is assumed.

The white pixels 101G in the drawing represent pixels sensitive to green (G). Hereinafter, the pixel 101G is referred to as green pixel 101G. The black pixels 101R in the drawing represent pixels sensitive to red (R). Hereinafter, the pixel 101R is referred to as red pixel 101R. The gray pixels 101B in the drawing represent pixels sensitive to blue (B). Hereinafter, the pixel 101B is referred to as blue pixel 101B.

For example, it is thought that the light intensity value of red is restored by the de-mosaicking process using the green pixel 101G at a position Pa in the drawing as a target pixel. It is assumed that the distance to the red pixel 101R at a position Pb on the left side thereof is D. In this case, the red pixel 101R at a position Pc on the upper side thereof and the red pixel 101R at a position Pd on the right side thereof exist as the pixels 101 separated by two pixels from the target pixel 101G. The distance from the red pixel 101R at the position Pc is 2D. On the contrary, the distance from the red pixel 101R at the position Pd is $\sqrt{3}$D. Accordingly, in the method according to this embodiment, the de-mosaicking process is carried out, not by employing 2D or $\sqrt{3}$D as the distance from the pixel 101 separated by two pixels, but by approximating both distances to 2D.

For example, it is assumed that the light intensity value of the red pixel 101R at the position Pb is 80, the light intensity value of the red pixel 101R at the position Pc is 75, and the light intensity value of the red pixel 101R at the position Pd is 89. In this case, when the distances between the pixels are correctly calculated, the value of the green pixel 101G at the position Pa interpolated by the de-mosaicking process is 80.19. On the other hand, when the calculation is made by approximating the distance from the pixel 101 separated by two pixels to 2D using the method according to this embodiment, the value of the green pixel 101G at the position Pa interpolated by the de-mosaicking process is 80.0. The difference therebetween is merely 0.24 and thus the method according to this method can be satisfactorily employed for actual use.

The combination of color filters is not particularly limited to the example shown in FIG. 23, that is, the arrangement of three colors of RGB.

FIGS. 24A to 24D show four possible examples of the arrangement of color filters in the image sensor with the present honeycomb structure including 7 sharing pixels.

Figure 24A:
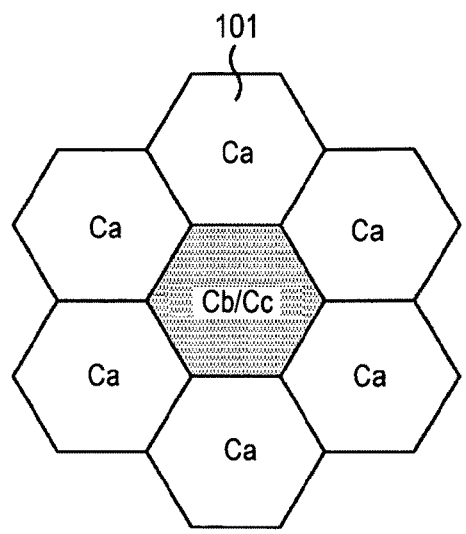
FIGS. 24A to 24D are diagrams illustrating arrangements of color filters which can be taken by the image sensor with a honeycomb structure including 7 sharing pixels according to the embodiment of the invention.

FIG. 24A shows an arrangement of three types of color filters Ca, Cb, and Cc. For example, when the image sensor with the present honeycomb structure is applied to a visible-wavelength image sensor, it is preferable that the color filter Ca is a filter transmitting a green wavelength. Color filters transmitting blue and red wavelengths can be employed as the color filters Cb and Cc.

Figure 24B:
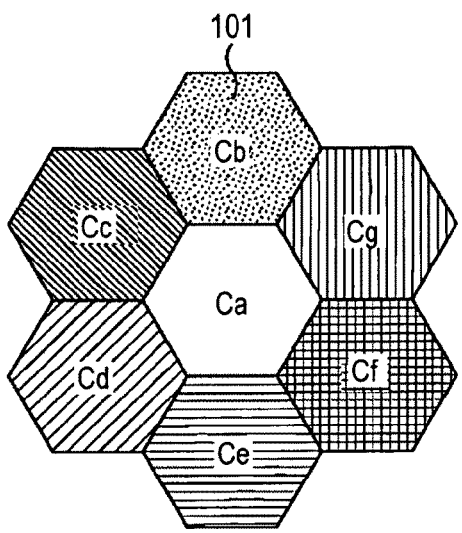

FIG. 24B shows an arrangement of seven types of color filters Ca, Cb, Cc, Cd, Ce, Cf, and Cg. For example, one-color filters of RGB, cyan, magenta, yellow, white, ultraviolet, and other wavelength can be employed as the seven types of color filters Ca, Cb, Cc, Cd, Ce, Cf, and Cg.

Figure 24C:
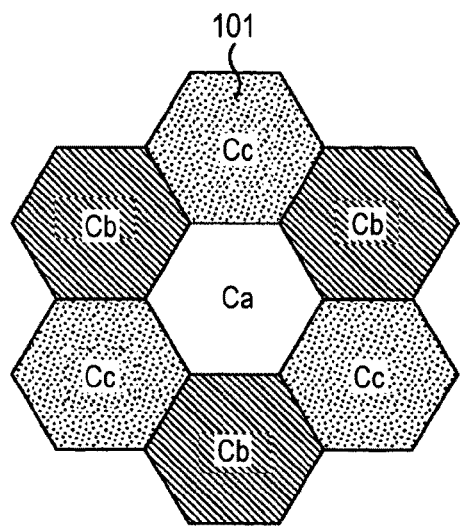

FIG. 24C shows an arrangement of three types of color filters Ca, Cb, and Cc. For example, a predetermined type of color filter Ca is arranged for the center pixel 101. The other two types of color filters Cb and Cc are alternately arranged for six pixels 101 surrounding the center pixel 101.

Figure 24D:
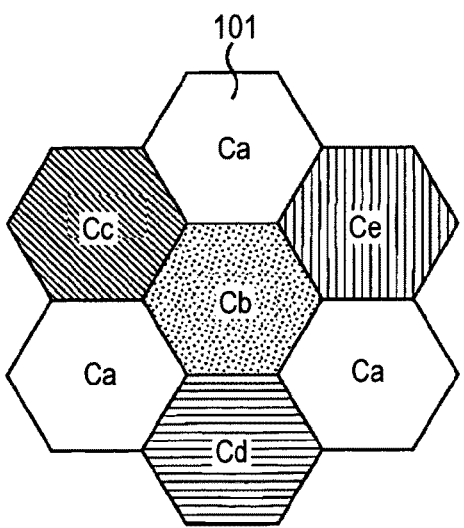

FIG. 24D shows an arrangement of five types of color filters Ca, Cb, Cc, Cd, and Ce. For example, one-color filters of RGB, cyan, magenta, yellow, white, ultraviolet, and other wavelength can be employed as the five types of color filters Ca, Cb, Cc, Cd, and Ce. However, it is preferable that the most color filters Ca are the filter transmitting a green wavelength.

When the arrangements shown in FIGS. 24A to 24D are employed, the method shown in FIG. 23 can be employed without any change as the method of acquiring color information of the pixels using the de-mosaicking process.

The interpolation of pixels using the de-mosaicking process will be described now. By this interpolation, it is possible to improve the spatial resolution.

Figure 25:
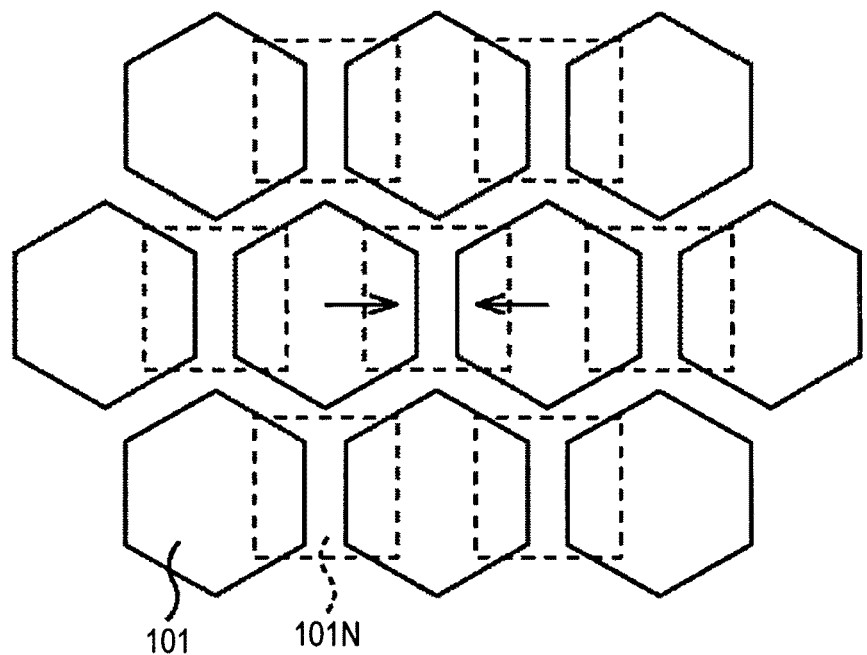
FIG. 25 is a diagram illustrating a method of interpolating the pixels using the de-mosaicking process.

FIG. 25 is a diagram illustrating an example of the interpolation of pixels using the de-mosaicking process.

The pixels 101 of the honeycomb shape drawn by solid lines represent actual pixels. On the other hand, the pixels 101N drawn by dotted lines represent virtual pixels which can be reproduced by the de-mosaicking process. In the present honeycomb structure, the actual pixels 101 are arranged in axes tilted by 60 degrees. That is, the present honeycomb structure, when one axis is fixed to a horizontal or vertical direction, the other axis is offset by a semi-pixel. Accordingly, an average of the pixel values of two actual pixels 101 adjacent to each other in the horizontal direction can be used as the pixel value of the virtual pixel 101N. Accordingly, it is possible to double the resolution in the horizontal direction. As a result, it is possible to enhance the substantial resolution of the image sensor with the present honeycomb structure.

3. Solid-State Imaging Device According Another Embodiment

Figure 26:
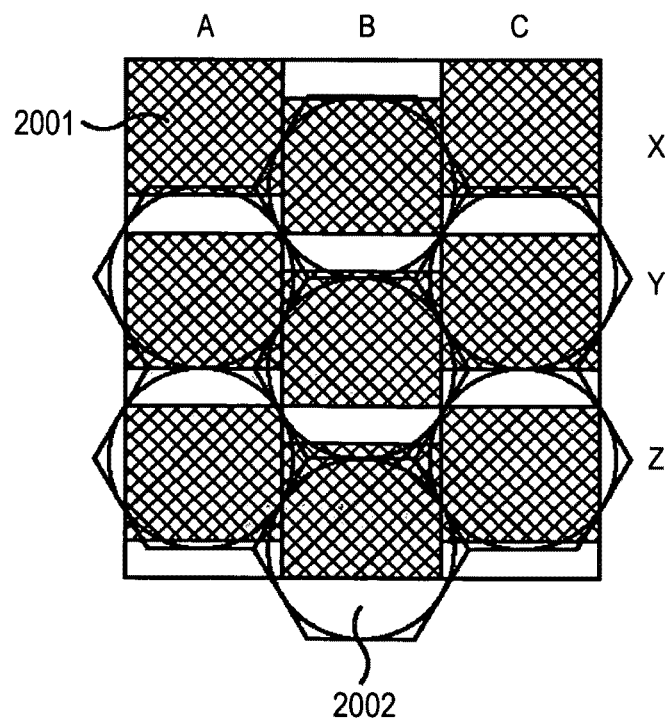
FIG. 26 is a diagram illustrating an example of a solid-state imaging device according to an embodiment of the invention, which has a configuration different from that of the image sensor with a honeycomb structure according to the embodiment of the invention.

FIG. 26 is a diagram illustrating an example of a solid-state imaging device according to another embodiment of the invention, which has a configuration different from that of the image sensor with the present honeycomb structure.

In the example shown in FIG. 26, the square matrix structure is employed as an arrangement structure of pixels 2001. The present honeycomb structure including 7 pixels as one unit is employed as an arrangement structure of light-collecting elements 2002.

As described above, the present honeycomb structure has a greater filling factor than that of the square matrix structure. Accordingly, the light-collecting elements 2002 with the present honeycomb structure can have efficiency higher than that of the light-collecting elements with the square matrix structure having the same area. On the other hand, when the past square matrix structure is employed as the arrangement structure of the pixels 2001, existing architectures can be embodied. That is, the structure of the solid-state imaging device shown in FIG. 26 can be said to be a structure having the merits of both the present honeycomb structure and the square matrix structure as a whole. In the relation between the present honeycomb structure and the square matrix structure, the square matrix is relatively offset by ¼ pixel. However, with this offset, there is no problem when the high light-collecting efficiency of the light-collecting elements 2002 with the present honeycomb structure is embodied using the existing pixel architectures.

4. Advantages of Present Honeycomb Structure

Advantages of the present honeycomb structure will be described now.

Comparing the present honeycomb structure with the square matrix structure shown in FIG. 1A, the filling factor 12 increases as described above. In this way, the present honeycomb structure have advantages of a higher planar filling rate and a higher light-collecting efficiency, compared with the square matrix structure.

The present honeycomb structure has an advantage that the number of transistors can be reduced by the pixel sharing. That is, as described above, it is possible to embody a circuit architecture in which transistors are shared by four or more pixels using the image sensor with the present honeycomb structure. That is, in the maximum sharing pixel circuit architecture of the past square matrix structure, transistors are shared by four pixels. In the past pixel unit disclosed in Patent Document 5, transistors can be shared by only three pixels. However, in the image sensor with the present honeycomb structure, it is possible to easily cause more pixels (for example, 5, 6, or 7 pixels) to share the transistors. For example, in the image sensor with the present honeycomb structure including 7 sharing pixels, the reset transistor, the selection transistor, and the amplification transistor can be shared. Accordingly, it is possible to realize 10 transistors (Tr)/7 pixels=1.43 Tr/pixel. Compared with 2.0 Tr/pixel in the past pixel unit disclosed in Patent Document 5, it can be seen that the number of transistors per pixel is very small. When the FD driving operation of controlling the FD potential with the drain terminals is employed, an architecture in which the selection transistor is removed can be employed. In this case, the number of transistors per pixel is reduced to 9 transistors (Tr)/7 pixels=1.29 Tr/pixel. The decrease in the number of transistors per unit pixel enables efficiently a decrease in cost, an increase in the PD area due to the decrease in the circuit area, and an increase in yield or a decrease in power due to the decrease in the number of transistors.

In the present honeycomb structure, the light-collecting elements which can reduce in-plane unbalance of the light-collecting characteristic in the image sensor can be employed as the light-collecting elements such as the on-chip micro lenses. The present honeycomb structure can facilitate the detection of a phase difference using the light-collecting elements. The present honeycomb structure is a large honeycomb structure including, for example, 7 pixels. It is possible to easily form a honeycomb structure surrounding a center pixel by plural folds on the basis of the honeycomb structure including 7 pixels. Accordingly, one light-collecting element can be employed for plural pixels in the present honeycomb structure. That is, the light-collecting elements can be shared by the pixels. Accordingly, it is possible to embody the light-collecting element with a size not causing any deterioration in processing precision. As a result, it is possible to reduce the in-plane unbalance of the light-collecting characteristic in the image sensor. By arranging plural pixels for one light-collecting element, it is possible to detect the phase difference of the light from the subject between the pixels. As a result, it can facilitate the applications to the phase-difference detecting auto focusing function or the three-dimensional camera.

Only the light-collecting elements may be arranged with the present honeycomb structure and the pixels may be arranged with the past square matrix structure. In this case, since the circuit structure is similar to the past square matrix structure, it is possible to enjoy the merit of the present honeycomb structure with no anisotropy in light-collecting efficiency or spatial resolution.

The solid-state imaging device according to the embodiment of the invention can be applied to camera parts of various electronic apparatuses having an image capturing function. Examples of the electronic apparatus include a digital still camera, a digital video camera, a notebook personal computer, and a mobile phone. The solid-state imaging device according to the embodiments of the invention can be applied to a camera part of electronic apparatuses in all the fields which reproduce image signals input to the electronic apparatus or generated in the electronic apparatuses and which capture an image or video. The examples of the electronic apparatuses having such a camera part will be described below.

For example, the invention can be applied to a digital still camera as an example of the electronic apparatus. The digital still camera includes an imaging lens, a display unit, a control switch, a menu switch, a shutter, and the solid-state imaging device according to the embodiments of the invention.

For example, the invention can be applied to a notebook personal computer as an example of the electronic apparatus. In the notebook personal computer, the main body includes a keyboard operated at the time of inputting characters and the like and the main cover includes a camera part. The notebook personal computer is manufactured using the solid-state imaging device according to the embodiments of the invention as the camera part.

For example, the invention can be applied to a mobile terminal as an example of the electronic apparatus. The mobile terminal includes an upper chassis and a lower chassis. The mobile terminal has an open state and a closed state of two chassis. The mobile terminal includes a connection part (hinge part), a display, a sub display, a picture light, and a camera part in addition to the upper chassis and the lower chassis, and is manufactured using the solid-state imaging device according to the embodiments of the invention as the camera part.

For example, the invention can be applied to a digital video camera as an example of the electronic apparatus. The digital video camera includes a main body, a subject imaging lens disposed on a side surface toward for the front side, start/stop switches for capturing an image, a monitor, and the solid-state imaging device according to the embodiments of the invention.

The invention is not limited to the above-mentioned embodiments, but may be modified in various forms without departing from the spirit and scope of the invention.

The present application contains subject matter related to that disclosed in Japanese Priority Patent Application JP 2009-002441 filed in the Japan Patent Office on Jan. 8, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device, comprising:
a plurality of pixels each including an associated light-receiving element making a photoelectric conversion,
the plurality of pixels being arranged in a honeycomb structure comprised of a plurality of basic units in which each basic unit is formed of a predetermined pixel at least partly surrounded by three to six pixels neighboring the predetermined pixel out of the plurality of pixels; and
a plurality of lenses respectively associated with the plurality of basic units, wherein each one of the plurality of lenses is shared by each one of the pixels that form its associated basic unit,
wherein optical axes of the lenses located near the central portion of the solid-state imaging device are non-eccentrically aligned with the centers of the basic units associated with those lenses, and the optical axes of the lenses located away from the central portion of the solid-state imaging device are aligned eccentrically with the centers of the basic units associated with those lenses such that each of the optical axes is directed toward the central portion with a degree of eccentricity that increases as a distance from the central portion increases.

2. The solid-state imaging device according to claim 1, wherein each basic unit includes:
a transmission transistor disposed in each pixel of the basic unit; and
a reset transistor, a selection transistor, and an amplification transistor which are shared by the pixels of the basic unit.

3. The solid-state imaging device according to claim 1, wherein each basic unit includes:
a transmission transistor disposed in each pixel of the basic unit; and
a reset transistor and an amplification transistor which are shared by the pixels of the basic unit, and
the transistors of the basic unit are driven by an FD driving method of controlling an FD (Floating Diffusion) potential by driving the drain terminals thereof with pulses.

4. The solid-state imaging device according to claim 1, wherein each one of the plurality of lenses is shared by the pixels disposed along a circumference having a radius that is a predetermined distance equal to or greater than a distance from the predetermined pixel of the associated basic unit to the neighboring pixels of the associated basic unit.

5. The solid-state imaging device according to claim 1, wherein the solid-state imaging device focuses light from a subject, and a phase difference of an object located before or after a focusing position is detected to make a focusing determination or to acquire distance information to the object by causing a subset of the entire light flux from the object to selectively reach the pixels by the use of the light-collecting elements.

6. The solid-state imaging device according to claim 1, further comprising N types (where N is an integer equal to or greater than 3) of filters selectively transmitting specific wavelengths of light beams, wherein predetermined types of filters out of the N types of filters are disposed in the pixels of the basic unit.

7. The solid-state imaging device according to claim 6, wherein a type of filter is disposed in each pixel of each basic unit and a color of the pixel is interpolated by a calculation using a light intensity value of another pixel in which the corresponding type of filter is disposed and a relative pixel pitch between the pixel and the another pixel.

8. The solid-state imaging device according to claim 7, wherein when the pixel pitch is not an integral multiple of a unit pixel pitch, the pixel pitch is approximated to an integral multiple to calculate the color of the pixel.

9. A solid-state imaging device, comprising:
a plurality of pixels each including an associated light-receiving element making a photoelectric conversion, and
a plurality of lenses,
wherein a square matrix structure in which the light-receiving elements are arranged at vertices of a lattice shape formed by two perpendicular axes is employed as an arrangement structure of the light-receiving elements, and
a honeycomb structure is comprised of a plurality of basic units respectively associated with the plurality of lenses in which each basic unit is formed of a predetermined pixel at least partly surrounded by three to six pixels neighboring the predetermined pixel out of the plurality of pixels, and each one of the plurality of lenses is shared by each one of the pixels that form its associated basic unit,
wherein optical axes of the lenses located near the central portion of the solid-state imaging device are non-eccentrically aligned with the centers of the basic units associated with those lenses, and the optical axes of the lenses located away from the central portion of the solid-state imaging device are aligned eccentrically with the centers of the basic units associated with those lenses such that each of the optical axes is directed toward the central portion with a degree of eccentricity that increases as a distance from the central portion increases.

* * * * *